(12) United States Patent
Camoriano et al.

(10) Patent No.: US 8,061,524 B2
(45) Date of Patent: Nov. 22, 2011

(54) DEVICE AND METHOD FOR TRANSPORTING CATALYST TO A REACTOR VESSEL

(75) Inventors: Guillermo Camoriano, Louisville, KY (US); Clifford L. Johns, Louisville, KY (US)

(73) Assignee: Extundo Incorporated, Louisville, KY (US)

( * ) Notice: Subject to any disclaimer, the term of this patent is extended or adjusted under 35 U.S.C. 154(b) by 569 days.

(21) Appl. No.: 12/248,317

(22) Filed: Oct. 9, 2008

(65) Prior Publication Data

US 2009/0097958 A1    Apr. 16, 2009

Related U.S. Application Data

(60) Provisional application No. 60/980,013, filed on Oct. 15, 2007.

(51) Int. Cl.
*B65G 49/00* (2006.01)
(52) U.S. Cl. ........ 209/236; 414/157; 414/171; 414/179; 414/196; 414/804

(58) Field of Classification Search ............... 414/150, 414/152, 154, 157, 171, 179, 196, 206, 804; 209/28, 29, 36, 37, 44.4, 236, 643
See application file for complete search history.

(56) References Cited

U.S. PATENT DOCUMENTS

| | | | | |
|---|---|---|---|---|
| 2,194,626 | A * | 3/1940 | Wendeborn | 266/178 |
| 3,778,962 | A * | 12/1973 | James | 53/473 |
| 3,927,976 | A * | 12/1975 | Reimers et al. | 422/296 |
| 4,171,739 | A * | 10/1979 | Yamato | 198/704 |
| 4,215,011 | A | 7/1980 | Smith, Jr. | |
| 4,402,349 | A * | 9/1983 | Engert et al. | 141/9 |
| 4,402,643 | A * | 9/1983 | Lytton et al. | 414/160 |
| 5,473,978 | A * | 12/1995 | Colombo | 99/443 C |
| 5,626,455 | A * | 5/1997 | Keller et al. | 414/288 |
| 7,309,201 | B2 * | 12/2007 | McNaughton et al. | 414/160 |
| 7,597,529 | B2 * | 10/2009 | Diehl et al. | 414/804 |
| 7,731,916 | B2 * | 6/2010 | Dieterle et al. | 422/652 |
| 2006/0045825 | A1 | 3/2006 | Dieterle et al. | |
| 2006/0094593 | A1 | 5/2006 | Beech, Jr. et al. | |
| 2009/0145727 | A1 * | 6/2009 | Johns | 198/617 |

FOREIGN PATENT DOCUMENTS
WO  WO 98/02238  1/1998
* cited by examiner

*Primary Examiner* — Joseph C Rodriguez
(74) *Attorney, Agent, or Firm* — Camoriano and Associates; Theresa Fritz Camoriano; Guillermo Camoriano

(57) ABSTRACT

A device and method for transporting and handling catalyst for a chemical reactor.

17 Claims, 17 Drawing Sheets

DEVICE AND METHOD FOR TRANSPORTING CATALYST TO A REACTOR VESSEL

This application claims priority from U.S. Provisional Application Ser. No. 60/980,013 filed Oct. 15, 2007.

BACKGROUND

The present invention relates to packaging, handling and transporting catalyst to a chemical reactor tube, including furnace and reformer tubes.

A chemical reactor is typically a large vessel designed to accommodate a chemical reaction. The reaction is often exothermic, so the reaction often takes place in a shell and tube heat exchanger, with the reaction occurring inside the tubes and a coolant circulating outside the tubes. The vessel also can be a simple tank with a single volume of catalyst inside it. The chemical reaction also can occur in a single large tube. Some chemical reactions are done in furnace or reformer tubes, which may be a part of a system with 10 to 500 or more such tubes. Catalyst, typically in the form of pellets, may be loaded inside any of these reactor tubes to facilitate the reaction. The catalyst is replaced periodically.

The reactor tubes may be quite large, housed in a structure several stories tall, in which case the catalyst may be transported up several stories to an elevation above the top of the tubes so it may then flow by gravity into the top of the tubes. The catalyst typically is supplied in 2,000 or more pound "super sacks", 55 gallon drums, mini drums, metal bins or plastic bags loaded in pallet-mounted cardboard boxes.

The catalyst usually is trucked to the job site and dropped off at a catalyst staging area. To get the catalyst to the reactor vessel and its tubes, typically each catalyst container (super sack, drum, bin, box or bag) is first transported, via forklift truck, from the catalyst staging area to a crane or elevator staging area. The catalyst container is then loaded onto the elevator or secured to the crane by a member of the rigging crew, and the crane operator then lifts the load in accordance with verbal instructions and/or hand gestures issued by a crane spotter. A member of the rigging crew handles the tag line to guide and maintain control of the load as it is positioned over or near the reactor. The containers of catalyst may be set onto a hand truck on the top deck of the structure. The catalyst container is then hand trucked to a point adjacent a manway of the reactor vessel where the catalyst is manually poured or scooped into buckets and other containers such as hoppers with a calibrated volume or with a weight loaded charge per tube or otherwise handled and transferred into the reactor vessel for loading into the reactor tubes.

Sometimes, the crane also is used to hold the super sack of catalyst above the reactor vessel while the catalyst is gradually emptied from the super sack and loaded into the reactor tubes using a sock-like outlet hose that is integrated into the super sack design. The contents of the super sack may or may not pass by or through a screening device to remove dust and fines. Loading catalyst directly from the super sack further ties up the crane, and it is very difficult to control the volume of catalyst discharged from the super sack as well as minimize the amount of catalyst dust generated when this method of discharge is utilized. Flat open space to stage and store catalyst often is limited and at a premium in the area surrounding the upper part of the reactor.

The existing methods for transporting the catalyst are very labor intensive, requiring a forklift operator, a forklift spotter (who typically walks along the forklift truck to ensure that the forklift truck or its load does not injure personnel or hit something), a crane rigger, a crane operator, a crane spotter, a load tag-line handler, one or more people to "manhandle" the catalyst container from the spot where it is dropped by the crane to a spot adjacent the reactor vessel, or one or more people to "manhandle" the catalyst container into a hopper or screening device located above the tube, and one or more people to tend to the outlet of the sock at the end of the super sack or the outlet hose if a screening device is used.

Just as critical is the fact that "flying" catalyst (as it is referred to when using a crane to lift the catalyst to the top deck of the structure near the top of the tubes) cannot be performed during high wind conditions, nor is it desirable to do so when it is raining, as it is important to keep the catalyst and the reactor dry at all times. Furthermore, the crane and crane operator rental fee are very expensive and, typically, the crane is not available for any other task while it is "flying" catalyst Cranes for flying catalyst may also be in short supply since when the reactor is out of service much or all of the connected plant is also out of service and may have subsystems that are being maintained at the same time as the reactor and tubes. The crane requires a significant surface area (footprint) especially for its outriggers that are used for support. The crane also requires a significant amount of three dimensional space in which to operate in and around which personnel must use caution to avoid being under the boom and load as well as keeping clear of the swing of the boom. For plants with multiple reactors, a dedicated crane often is necessary for simultaneous work, placing further restrictions and limitations on crane operation. The crane(s) block access to the reactor and other nearby equipment that also may need to be serviced when the reactors are undergoing catalyst handling activities. Important work in, on, or near the reactor may need to be suspended until the crane can be moved into or out of position. Older reactors are particularly crowded during catalyst handling with the catalyst staging areas and crane taking up what is very limited space, leading to congestion, trip hazards, and blocked lines of sight. The cranes are typically diesel powered, resulting in a continuous source of emissions which can be harmful to personnel working in the area as well as being non-environmentally friendly. Some cranes produce a high noise level when operating and thus contribute to the overall noise level in the vicinity of the crane. High noise levels are known to result in increased stress on workers and to lower their efficiency.

Catalyst is typically a friable material (meaning that it is brittle, fragile, and easily crumbled, often even by hand). The weight of the catalyst itself in the super sacks or other containers, during transportation to the job site, and especially after being jostled, picked up and dropped by the forklift truck, the crane, the hand truck or dolly and even during unloading from the containers, can result in a considerable amount of broken catalyst and catalyst dust generation, both of which can have detrimental effects on the operation or performance of the reactor. It should also be noted that catalyst is both very expensive and very valuable, so it is desirable to keep the catalyst intact as much as possible, and to avoid breaking it or crushing it. Also, the creation of catalyst dust is undesirable from the point of view of the workers who have to deal with the catalyst and do not wish to be exposed to the dust. It is preferable that dust generation be held to a minimum at all times for reasons of performance, health and safety, the environment, and cost savings.

The super sack acts as a bin but without internal controls to prevent any classification (sorting by size) that can occur in bins or bags. Classification is undesirable, since it is commonly known that smaller pieces of material, in this case, catalyst fines and dust, will tend to automatically segregate or classify themselves from the larger and whole pieces of catalyst particles such that, when a sizable volume of catalyst in a pelletized form is discharged from a container, a significant amount of segregation can occur, as measured through accurate pressure-drop testing after loading the tubes. Classical segregation models show that it is common for significant particle-size variation to occur within a container of the size of a super sack. This segregation is undesirable, because it means that the flow of reactants will not be consistent throughout the reactor, which reduces the efficiency of the reactor and may create hot spots or other problems.

DESCRIPTION

Figure 1:
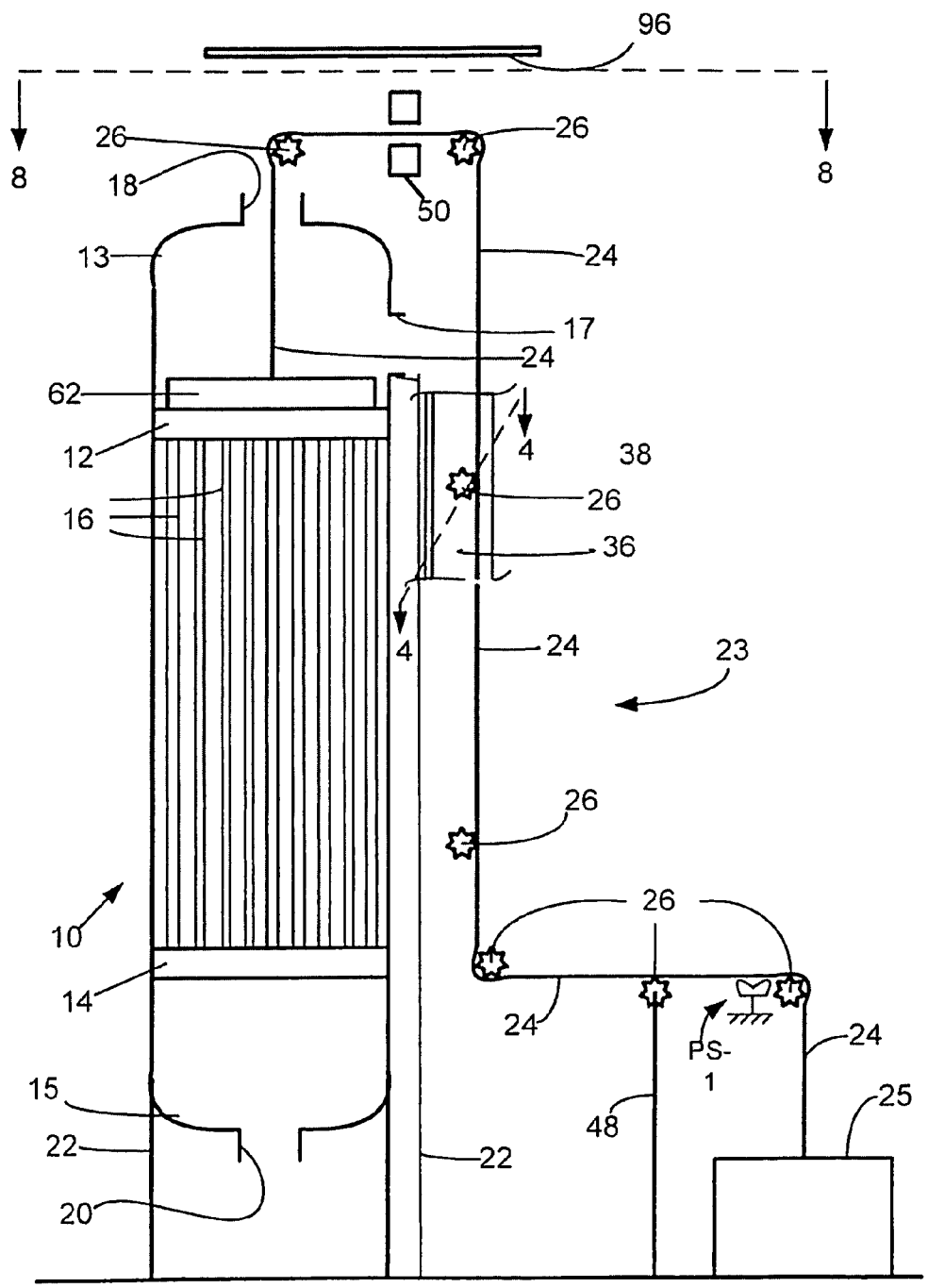
FIG. 1 is a schematic, partially broken away section view of a chemical reactor vessel including a catalyst handling device made in accordance with the present invention.

FIG. 1 depicts a typical chemical reactor vessel 10, which is a shell and tube heat exchanger, having an upper tubesheet 12 and a lower tubesheet 14 with a plurality of vertical tubes 16 welded or expanded to the tubesheets 12, 14 to form a tightly packed tube bundle. There may be from one to many hundreds or even thousands of tubes 16 extending between the tubesheets 12, 14. Each tube 16 has a top end adjacent the upper tube sheet 12 and a bottom end adjacent the lower tubesheet 14. The vessel 10 includes a top dome (or top head) 13 and a bottom dome (or bottom head) 15, as well as manways 17, 18, 20 for access to the tubesheets 12, 14 inside the vessel 10. The manways are closed during operation of the reactor but are opened for access, such as during catalyst handling. In this instance, the shell and tube heat exchanger is a chemical reactor, and the tubes 16 are filled with catalyst pellets, which facilitate the chemical reaction. However, similarly-shaped shell and tube vessels may be used for other purposes, such as for a boiler or other heat exchanger.

Reactors have either fixed or removable heads. In this embodiment, the heads are fixed, and they include manways 17 and 18 at the top and 20 at the bottom.

This particular reactor vessel 10 is fairly typical. Its tubes can range in length from 5 feet to 65 feet, and it is surrounded by a structural steel skid or framework 22, which includes stairways or elevators for access to the tubesheet levels of the reactor vessel 10 as well as access to intermediate levels and to a topmost level which may be located at or near the level of the top opening 18 of the reactor vessel 10. On a regular basis, which can be every 2 to 48 months or longer, as the catalyst becomes less efficient, less productive, or poisoned, it is changed out, with the old catalyst being removed and a new charge of catalyst being installed in the tubes 16 of the reactor vessel 10. Catalyst handling also can occur on an unplanned and undesirable schedule.

A catalyst change operation requires a complete shutdown of the reactor, resulting in considerable cost due to lost production. (The disclosed invention can be used not only for catalyst change operations but also on new reactors and tubes for their initial catalyst loading.) It is desirable to minimize the amount of time required for the catalyst change operation and to be able to proceed with the catalyst change operation even in inclement weather, including during periods of high wind or driving rain, and in conjunction with other maintenance activities, in order to minimize the lost production caused by the reactor shutdown.

Figure 5:
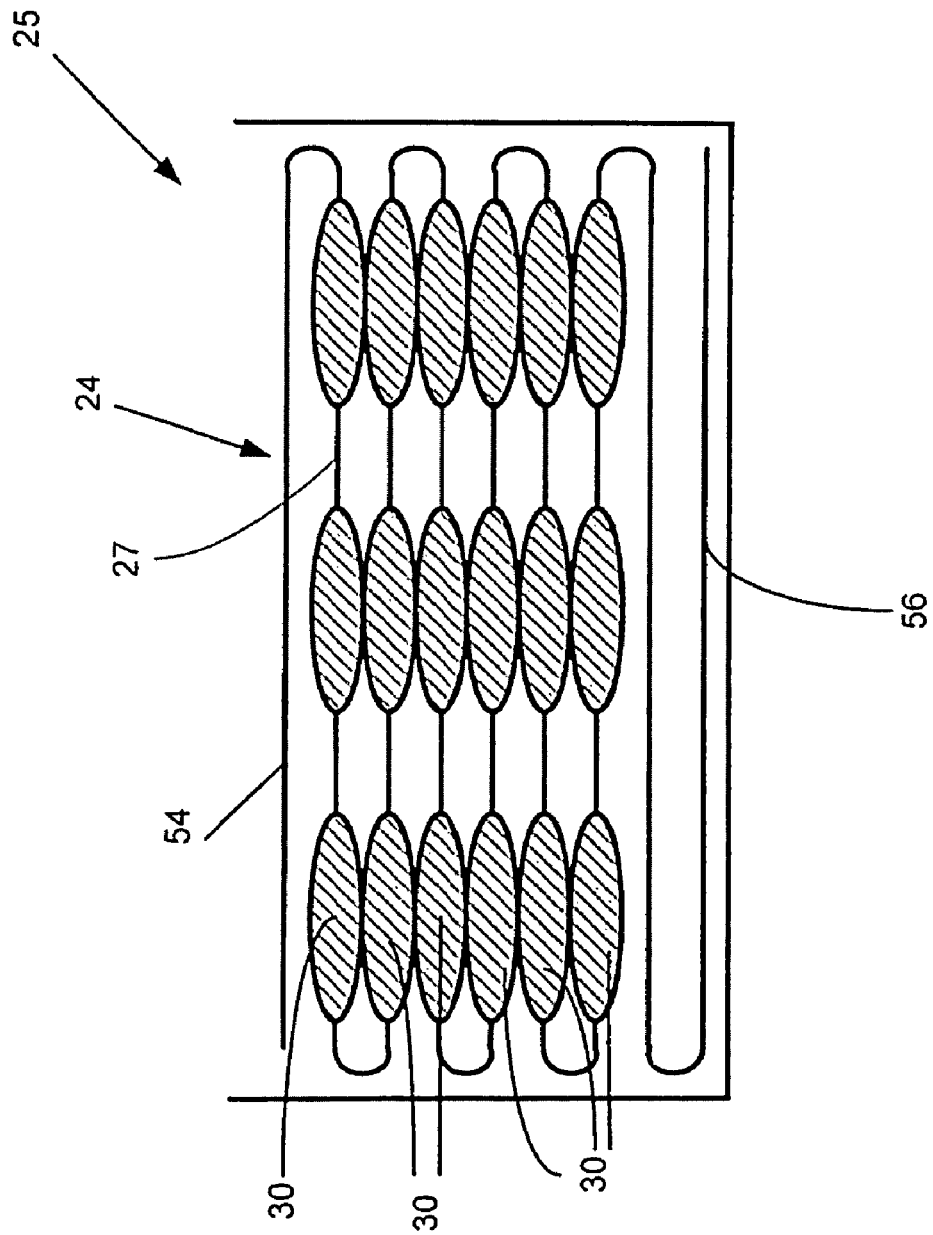
FIG. 5 is a schematic section view of the catalyst feed container of FIG. 1.

FIG. 1 also schematically depicts an example of a catalyst transport arrangement 23 made in accordance with the present invention. In this particular catalyst transport arrangement 23, the catalyst is packaged on an elongated belt 24, with the catalyst preferably being vacuum packed in individual pouches 30 (See FIG. 2), each containing the same amount of catalyst, and these pouches of catalyst are interconnected and spaced apart at regular intervals along the elongated belt 24. The elongated belt 24 is driven by a plurality of sprocket drive assemblies 26, enclosed in an extruded aluminum housing 36 as described in more detail below. The elongated belt 24 may be brought to the job site in containers 25 as depicted in FIGS. 1 and 5, described in more detail below, or the belt 24 can be created on-site.

The sprocket assemblies 26 define a fixed path along which the belt 24 travels from a lower elevation to an elevation above the tops of the tubes 16, and then back down again. The sprockets 26 also serve as fixed belt guides.

Figure 2:
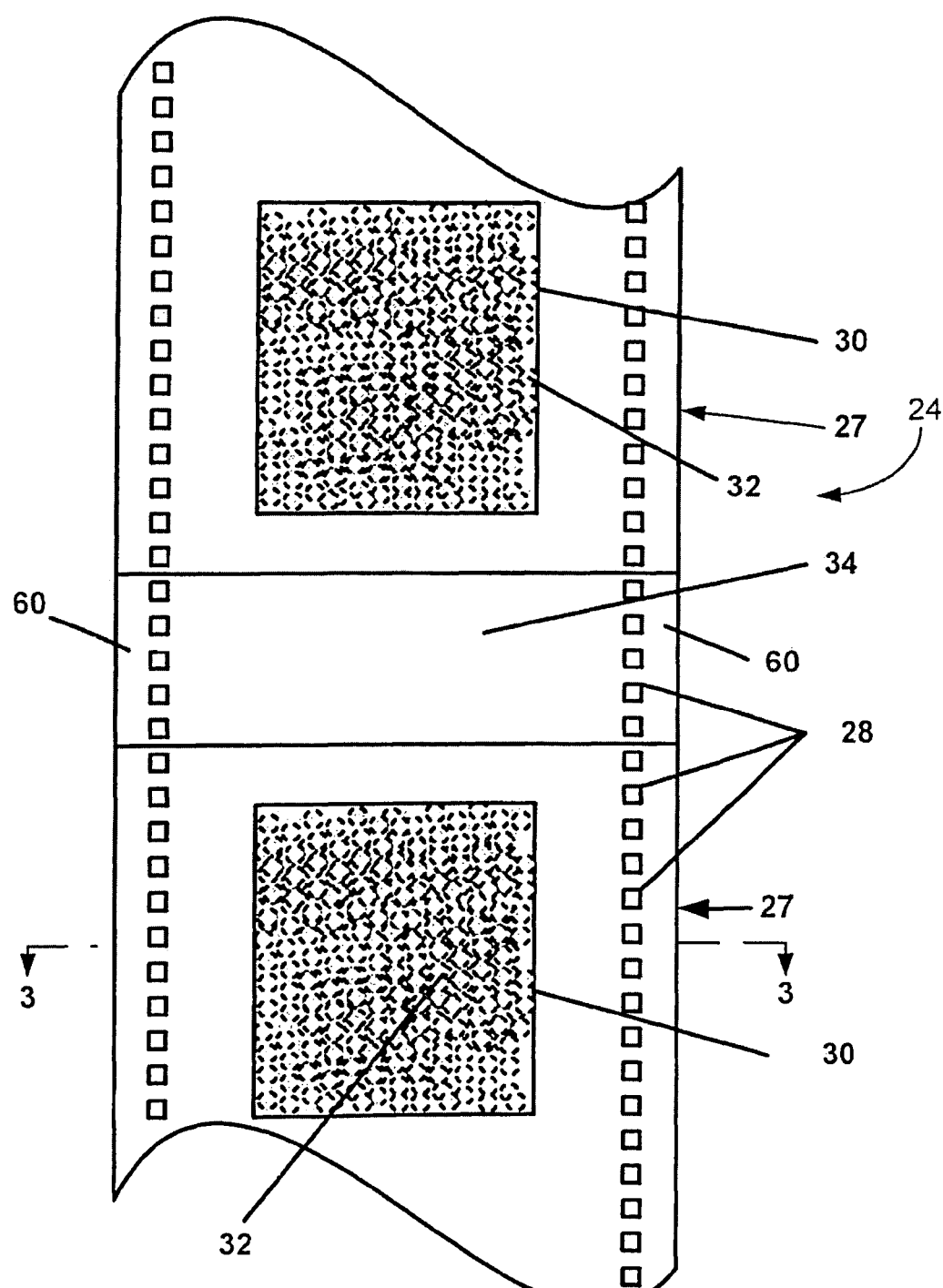
FIG. 2 is a plan view of the vacuum-packed catalyst of FIG. 1.
Figure 3:
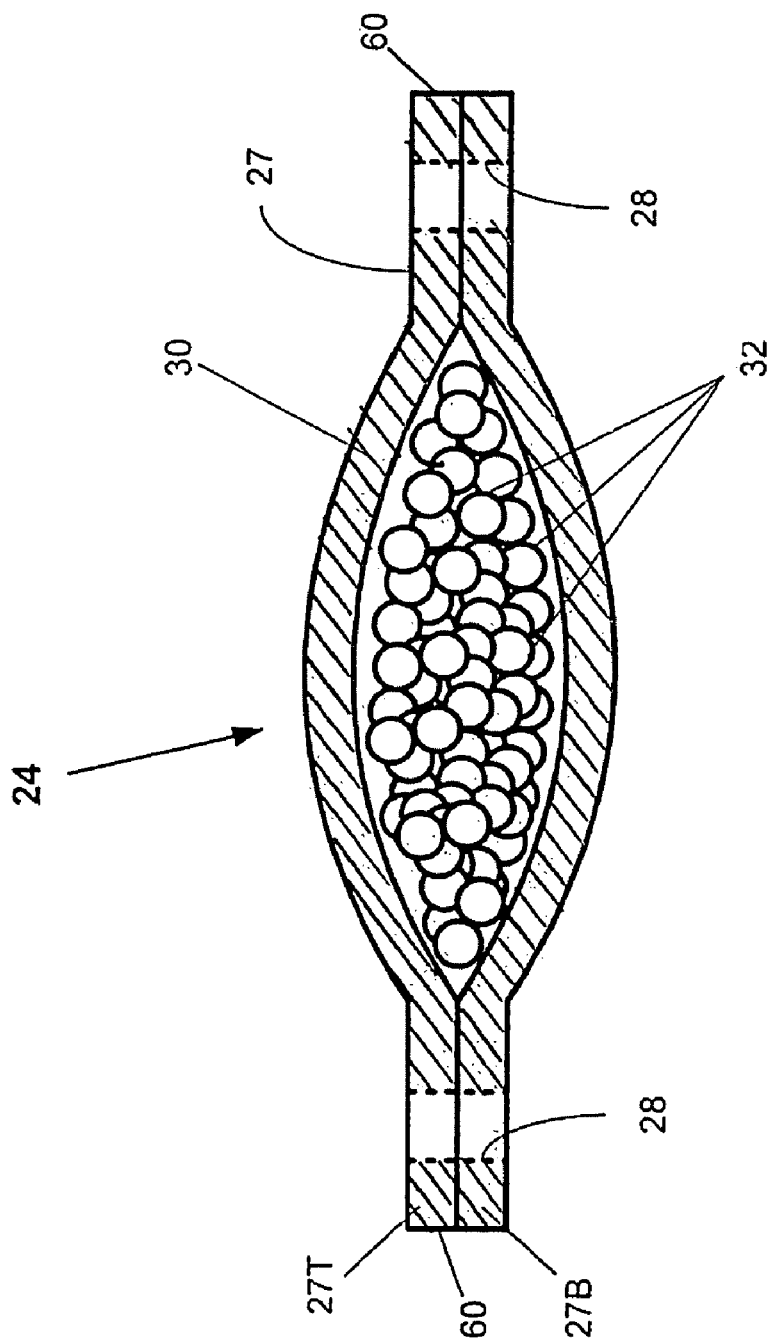
FIG. 3 is a section view along line 3-3 of FIG. 2.

Referring to FIGS. 2 and 3, this embodiment of the elongated belt 24 resembles a giant strip of 35 mm photographic film, with thin, flat edge portions 27 defining two edge rows of guide holes 28 on either side of the pouches 30 of vacuum packed catalyst pellets 32 (See FIG. 3). Each pouch 30 contains the same amount of catalyst pellets 32 and, in this embodiment, each pouch has a rectangular shape, as depicted in FIG. 2. (In another embodiment, the amount of catalyst in each pouch 30 could vary, with some pouches 30 having more catalyst than others, if desired.) The amount of catalyst in each pouch is limited to a maximum weight which can be readily handled and supported by the belt 24.

The belt 24 preferably is made of a high strength plastic or thermoplastic film material which shrink-wraps tightly and seals around the catalyst pellets 32, forming the pouches 30 during packaging of the catalyst. Preferably, the film shapes itself tightly around the catalyst 32, with the pressure inside the pouch 30 being substantially less than the ambient atmospheric pressure acting on the outside of the pouch 30, in order to prevent or severely limit any motion of the catalyst pellets 32 relative to each other within the pouch 30, thus greatly limiting the opportunity for breakage of the catalyst 32 during handling.

There are many possible materials which may be used for the belt 24, including materials such as oriented linear low-density polyethylene (LLDPE), or nylon poly. It is also possible for the belt 24 to be made as a multi-layer laminate, wherein a layer of high strength material is used as a substrate to aid in carrying the load of the catalyst 32 and a layer of plastic provides a water-tight and air-tight enclosure.

Vacuum packaging and shrink packaging are well-known, in the packaging industry; and are commonly used to package foods and hardware, such as fish and nuts and bolts. The known procedures could be adapted to form the catalyst belt 24 with the evenly-spaced holes 28 as shown here.

As can be appreciated from FIG. 2, the individual catalyst filled pouches 30 are spaced apart along the length of the belt 24, with portions 34 of the belt 24 having no pouches 30. The pouch-free portions 34 may be as long as desired, or they may be very short, in fact just long enough to ensure that the top and bottom layers 27T, 27B respectively (See FIG. 3) of the belt 24 are able to form a proper bond to separate one pouch 30 from the next pouch 30.

It is envisioned that each pouch 30 would contain between 10 and 50 pounds (5 to 25 Kgs) of catalyst 32, although other quantities could be used. While the combined weight of all the full pouches 30 as they are pulled up the side of the reactor building by the catalyst transport arrangement 23 (See FIG. 1) may add up to several thousand pounds, the large number of sprocket assemblies 26 interspersed along the length of the catalyst transport arrangement 23 would serve to keep the load that is "seen" or supported by any portion of the belt 24 to a more reasonable level, possibly in the several hundred pound range.

Referring to FIGS. 1 and 2, the two parallel rows of guide holes 28 are engaged by the teeth of the sprocket assemblies 26 to propel the elongated belt 24 along the length of the guide path. FIG. 1 shows an enclosure 36 (which is partially broken away for clarity) that encloses the belt 24 and the sprocket assemblies 26.

Figure 4:
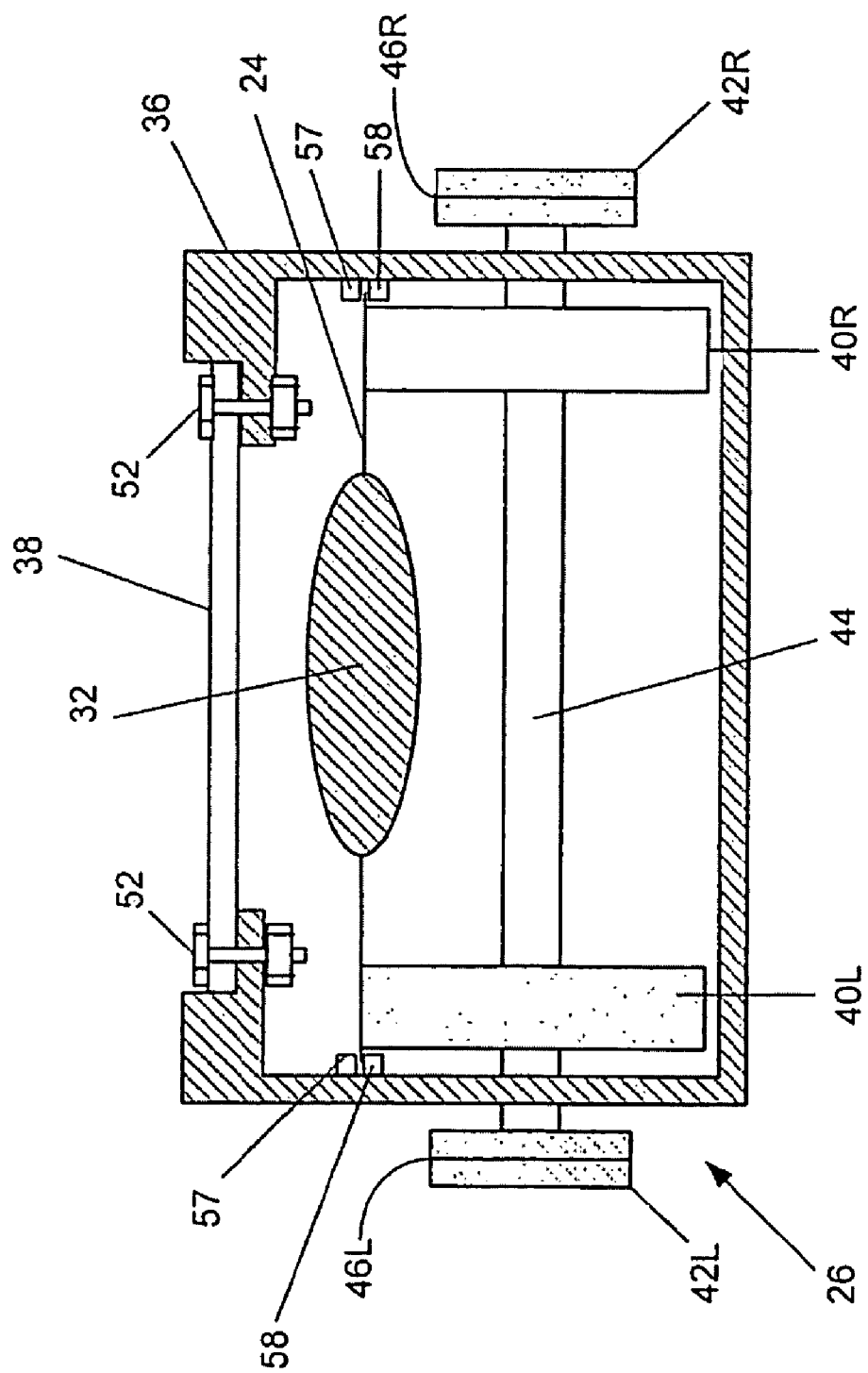
FIG. 4 is a section view along line 4-4 of FIG. 1, showing the vacuum-packed catalyst riding in a sprocket drive mechanism enclosed in a housing (the housing is broken away for clarity in FIG. 1)

FIG. 4 is a section view along line 4-4 of FIG. 1, showing the enclosure 36. In this embodiment, the enclosure 36 is an extruded aluminum housing with a "C"-shaped cross-sectional profile. A flat, shatterproof Plexiglas sheet 38 is secured to the housing 36 via bolts 52, closing off the open portion of the enclosure 36 and making the interior of the enclosure 36 visible from the outside. In this embodiment, the elongated belt 24 is inside the enclosure 36 from the moment it exits the container 25 (See FIG. 1) until it reaches the top opening 18 of the reactor 10. Alternatively, the housing 36 may be used selectively where desired, such as in the vertical run of the catalyst transport arrangement 23, or the housing 36 may be omitted altogether.

Referring to FIG. 4, the housing 36 rotationally supports the sprocket assembly 26, which includes two sprockets 40L, 40R, two pulleys 42L, 42R, and an interconnecting axle 44. The pulley 42L (which may alternatively be a sprocket) is connected to a drive motor (not shown) through a belt drive or a chain drive 46L. In this instance, the axle 44 transfers the power from the chain drive 46L to both sprockets 40L, 40R and to the pulley 42R, which, in turn, has another belt or chain drive 46R that drives the next sprocket assembly 26 located further downstream along the fixed path of the catalyst transport arrangement 23. In this manner, all the sprocket assemblies 26 are synchronized such that, when one sprocket assembly 26 is actuated by the drive motor, all the other sprocket assemblies 26 are instantly actuated as well, advancing the elongated belt 24 from the container 25 to the reactor opening 18. By reversing the direction of rotation of the drive motor, it is possible to drive the elongated belt 24 in the reverse direction, from the reactor opening 18 back to the container 25.

The housing 36 provides a convenient means for securing the catalyst transport arrangement 23 to stanchions 48 (See FIG. 1) and to the structural steel frame 22 of the reactor 10. The housing 36 also keeps the belt 24 dry and protected from inclement weather. If the belt 24 is not completely protected from the weather by the housing 36, then it may be desirable to provide a blow off station 50 and protective roof cover 96, as shown in FIG. 1, to ensure that the elongated belt 24 is dry when it reaches the opening 18 leading into the reactor 10. The catalyst 32 itself is kept dry regardless of whether a housing 36, roof 96, or blow off station 50 are used, as the catalyst 32 is sealed inside the pouches 30 of the elongated belt 24.

The housing 36, if properly secured to the structural steel frame 22, also allows the catalyst transport arrangement 23 to continue operating even during periods of high wind or driving rain. The shatterproof Plexiglas sheet 38 allows quick visual inspection of the condition of the elongated belt 24 as it travels along the catalyst transport arrangement 23, such that any problems can be readily identified. The Plexiglas sheet 38 also allows ready access to the housing 36 to correct any problem which may arise.

It is envisioned that the housing 36 will be made in relatively short lengths, perhaps 8 to 10 feet long, of extruded aluminum, to make the lengths manageable from the points of view of weight, handling, installation, transportation, and storage. The shatterproof Plexiglas sheets 38 would likely match the length of their respective housing portions. Lights, not shown, may be installed in the housing 36 to permit ease of inspection during night time catalyst loading. The housing 36 may also be designed to extend telescopically so it may collapse for transport or storage.

The installation of the catalyst transport arrangement 23 may be temporary, to be used only during the catalyst changeover operation. However, the plant may decide to make the investment for a permanent installation of the catalyst transport arrangement 23 which would be used on a regular basis for catalyst changeover, and which might even be used to transport other materials used for maintenance and operations such as hardware, parts, tools, test equipment, samples and other supplies.

FIG. 5 is a schematic, section view of the container 25 of FIG. 1. It depicts an elongated belt 24 folded in the container 25, with three pouches 30 abreast stacked six rows high, and including a pouchless lead belt portion 54 as well as a pouchless trailing belt portion 56. The pouchless portions 54, 56 may be identical in every respect to the rest of the belt 24 except that no catalyst is loaded in these lead and trailing portions 54, 56. Referring back to FIG. 4, the housing 36 includes outer and inner belt guides 57, 58 respectively on both sides of the housing 36. The outer edges 60 of the belt 24, which project beyond the guide holes 28, are captured between these guides 57, 58 of the housing 36. This permits the pouchless lead portion 54 of the elongated belt 24 to be fed through the catalyst transport arrangement 23 so as to facilitate the initial "threading" of the elongated belt 24 through all the sprocket assemblies 26 while there is no weight on the belt 24.

Typically, it is anticipated that the length of the pouchless lead portion 54 would not have to be any longer than the maximum vertical rise of the catalyst transport arrangement 23, and in fact this length may be as short as the maximum distance between two adjacent sprocket assemblies 26 or the distance from the container 25 to the first sprocket assembly 26, whichever is greater. Similarly, the trailing portion 56 would generally be long enough to allow it to be spliced to the lead portion 54 of the next container 25 of the elongated belt 24.

The container 25 preferably comes loaded from the catalyst manufacturing facility as shown in FIG. 5. The container itself may be a reusable plastic container, and this same container may then be used to send "spent" catalyst back to a catalyst reclaiming site, preferably with a heavy duty plastic liner in the container to protect the container from contamination with catalyst dust. The container 25 is preferably designed so it may be readily handled with a hand truck, a forklift truck, and/or a crane, and may include a container top or cover (not shown) to protect the elongated belt 24 from the elements during transportation and storage.

The container 25 of FIG. 5 is only a schematic representation of the container 25 and its contents. Depending on the size of each pouch 30 in the elongated belt 24, and the total weight of each elongated belt 24, each container 25 may hold one or more elongated belts 24, and each elongated belt 24 may be packed in the container with more (or fewer) than three pouches 30 abreast and more (or fewer) than six rows high.

Of course, the catalyst 32 (or any other material being transported in the catalyst transport arrangement 23) need not come to the job site already packaged in the elongated belt 24. It may come in bulk or in some presentation other than prepackaged in the elongated belt 24, and it could be inserted into pouches on an elongated belt at the job site. Likewise, the catalyst 32 need not necessarily be vacuum packed or shrink-packed in the elongated belt 24 in order to transport it up to the reactor 10. Even though vacuum packaging or shrink packaging are preferred for friable material such as catalyst in order to provide good protection for the catalyst material, the catalyst 32 or other supplies to be transported by the arrangement 23 could be more loosely packaged on the elongated belt 24.

Figure 7:
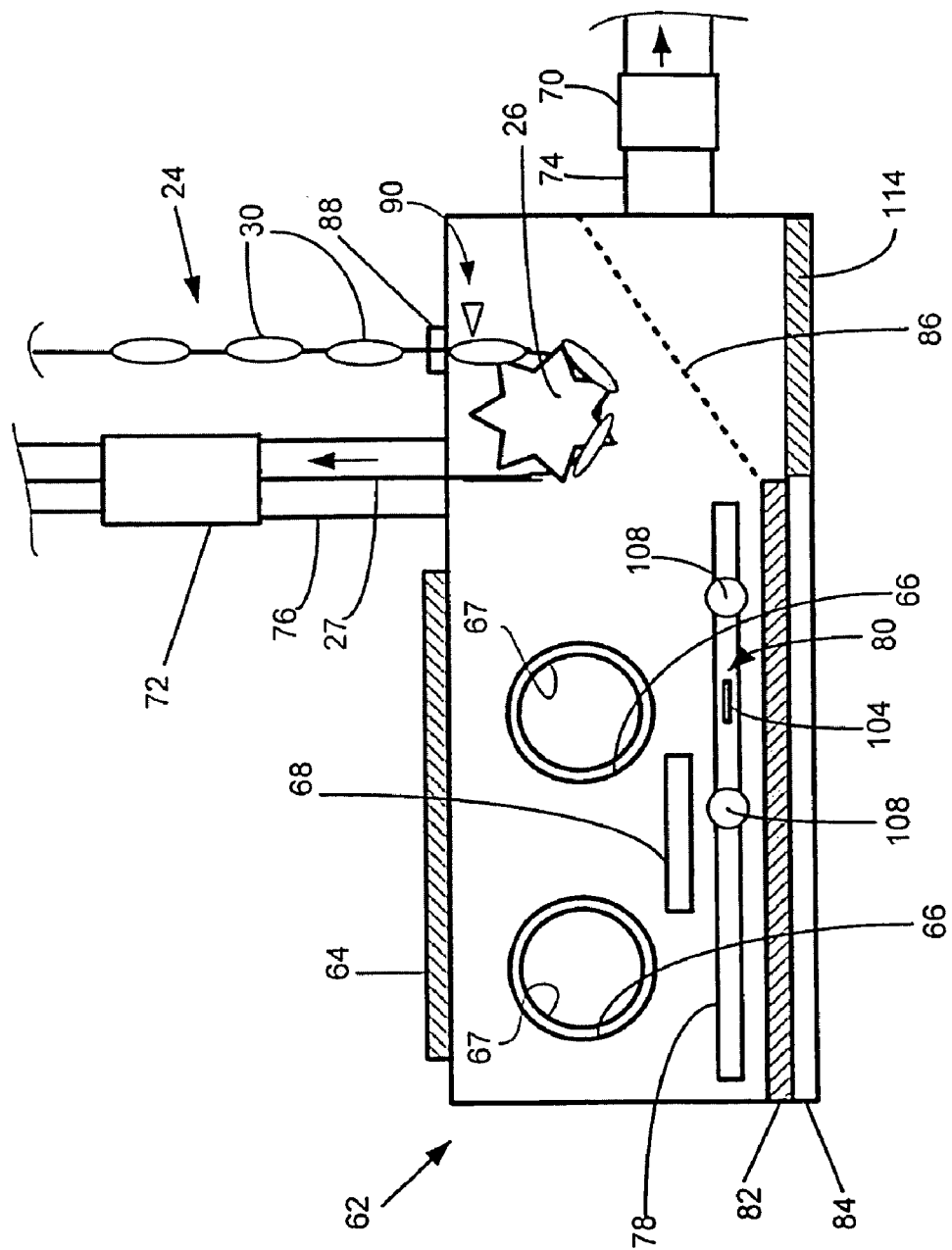
FIG. 7 is a section view of the vacuum box of FIG. 1.

Once the catalyst 32 reaches the inside of the reactor vessel 10, it is removed from the elongated belt 24 and is inserted into the reactor tubes 16. It may simply be deposited onto the tube sheet 12 and then swept, brushed, or otherwise pushed into the tubes 16 as is known in the art. Sleeves 15 (See FIG. 7B) or other templates may be used in that process, as is known in the art. FIG. 7B shows a plurality of sleeves 15 inserted into the tubes 16 and resting on the upper tube sheet 12.

A catalyst vacuum box 62, as shown in. FIGS. 1 and 7, may be used instead of or in addition to the sleeves 15 or other templates. The vacuum box 62 serves to aid the catalyst handling personnel in their task of loading the reactor tubes 16 while minimizing their contact with the catalyst and any catalyst dust. It may eliminate the need for the personnel to wear gloves and/or respirators while loading catalyst into the reactor tubes 16.

The vacuum box 62 includes a housing, which, in this case, is rectangular, enclosed on all sides except the bottom, which is open to the tubesheet 12 upon which it rests during operation. The top of the vacuum box 62 defines an opening enclosed by a clear cover 64 to allow the operators to observe the work progress as they manipulate the catalyst through portholes 66 with flexible, dust barriers 67 (such as rubber gloves or plastic mittens) having cuffs that are built into and sealed against the portholes 66. Two portholes 66 are shown on one side of the vacuum box 62, and there are similar portholes on the opposite side of the box 62 to allow two operators to work together to manipulate the catalyst within the vacuum box 62.

Each side of the vacuum box 62 also defines slotted air vents 68 to allow ambient air to enter into the vacuum box 62, drawn by the suction created by the vacuum lines 70, 72 connected to the vacuum box 62. The air vents 68 provide an air inlet to the box 62 to keep the window 64 clear and purge the box interior of dust as catalyst is being loaded. The vacuum lines 70, 72 are connected to the vacuum box 62 via their respective connection ports 74, 76. The vacuum lines 70, 72 extend to a remote location distant from the tube sheet 12 and are connected to a remote vacuum pump or other vacuum source and may include an in-line dust collector mechanism (not shown). Each side of the vacuum box 62 also defines an additional slotted opening 78 to slidably receive a movable frame 80 (See also FIG. 10) as described in more detail later.

The bottom of the vacuum box 62 may include a fixed frame 82 which may include any of a number of catalyst loading aid devices such as a template, screen, flexible grid, loading sleeves 15, or other loading devices. In this particular embodiment, the frame 82 includes a template having openings with a smaller diameter than the inside diameter of the tubes 16 and arranged so they can be aligned with the tubes 16. Alternatively, the frame 82 could be removed, and loading sleeves 15 as shown in FIG. 7B could be inserted into the tubes 16 prior to using the vacuum box 62.

A flexible gasket 84 at the bottom edge of the vacuum box 62 provides a relatively tight seal between the vacuum box 62 and the tubesheet 12. Note that, even if a tight seal is not achieved between the vacuum box 62 and the tubesheet 12, the negative pressure (vacuum) present inside the vacuum box 62 relative to the ambient air pressure outside the box 62 results in a net inflow of ambient air into the vacuum box 62, which minimizes the opportunity for catalyst dust to exit the vacuum box 62 anywhere except at the vacuum outlet ports 74, 76.

A slotted inlet opening 88 on the top of the vacuum box 62 allows the elongated belt 24 to enter the vacuum box 62, where a knife 90 slits open the pouches 30 as they enter the box 62 in order to release the catalyst onto an inclined screen or mesh 86, which is located just below the knife 90 and between the sprocket assembly 26 and the outlet port 74 for the vacuum line 70. As the catalyst is released from the pouches 30, most catalyst dust and small catalyst fragments work their way through the screen 86 and are vacuumed away through the vacuum line 70 (and then typically on to a cyclone separator for recovery of the catalyst dust and catalyst fragments). The bottom of the vacuum box 62 includes a partial floor 114 immediately below the inclined screen 86. This floor 114 prevents any catalyst dust and small catalyst fragments which work their way through the screen 86 from falling into any tubes 16 of the tubesheet 12. The whole catalyst pellets, which are too large to pass through the screen 86, slide down the inclined screen 86, onto the catalyst loading aid device on the frame 82, and out the open bottom of the box 62. In this embodiment, the screen 86 is inclined at an angle of approximately thirty degrees from the horizontal. It is preferred that the angle of incline be between fifteen and sixty degrees and more preferred that it be between twenty and forty-five degrees.

The operators may then spread or otherwise manipulate the catalyst using the movable frame 80 (shown in more detail in FIG. 10) or using their hands inserted into the flexible, dust barriers 67 in the portholes 66.

Once the pouches 30 have been emptied of catalyst, the remaining empty belt 24 is conveyed up through the vacuum line 72 by additional sprockets, and the vacuum line 72 draws out any remaining dust particles which may still be clinging to the emptied pouches 30.

Figure 8:
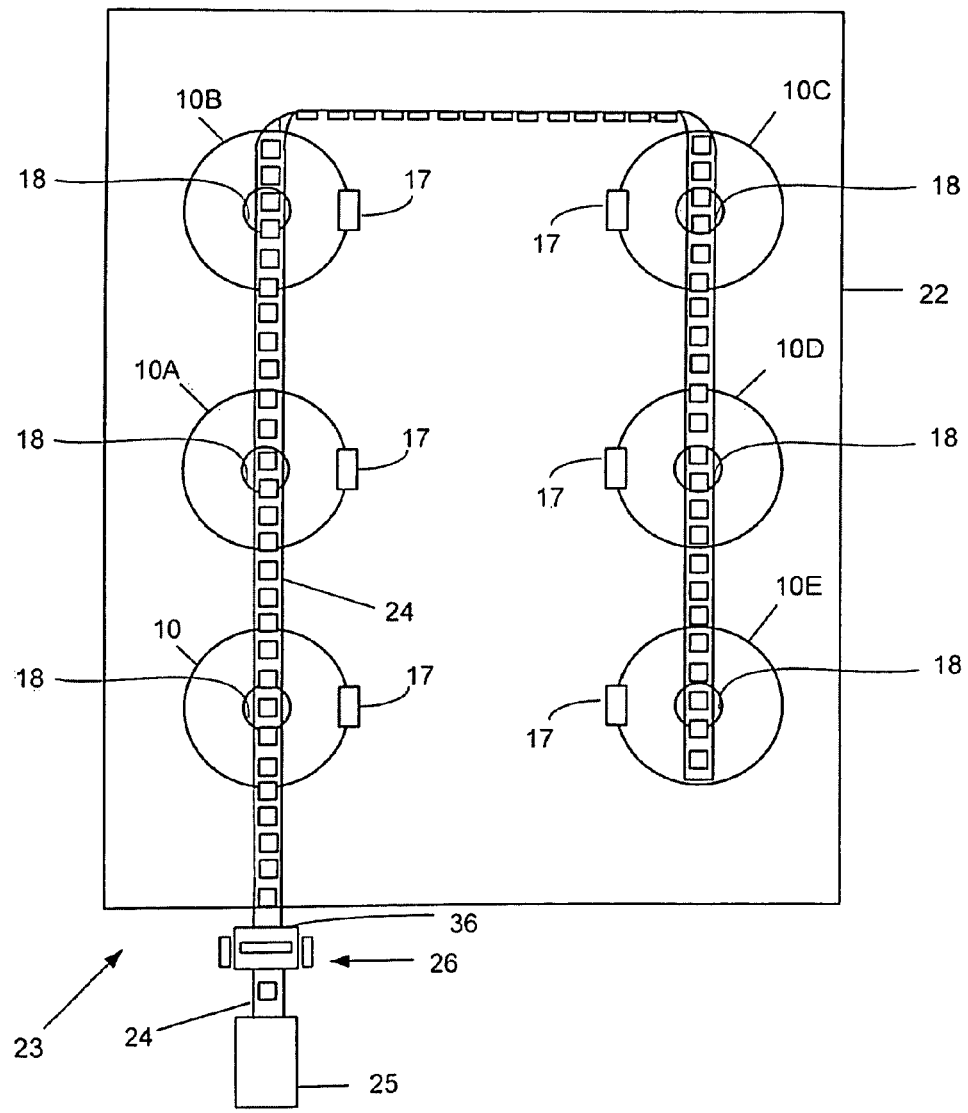
FIG. 8 is a view along line 8-8 of FIG. 1, but for a reactor arrangement that includes six reactors instead of the single reactor shown in FIG. 1.

FIG. 8 is a plan view of the reactor 10 and catalyst transport arrangement 23 of FIG. 1, but with additional reactors 10A, 10B, 10C, 10D, and 10E shown mounted on the structure 22. The housing 36 is shown only in the vertical rise of the catalyst transport arrangement 23. However, as indicated earlier, the housing 36 may enclose any portion of the elongated belt 24 (from the point it exits the catalyst container 25 all the way to the last reactor 10E), or there may be no housing 36 enclosing the elongated belt 24.

Figure 10:
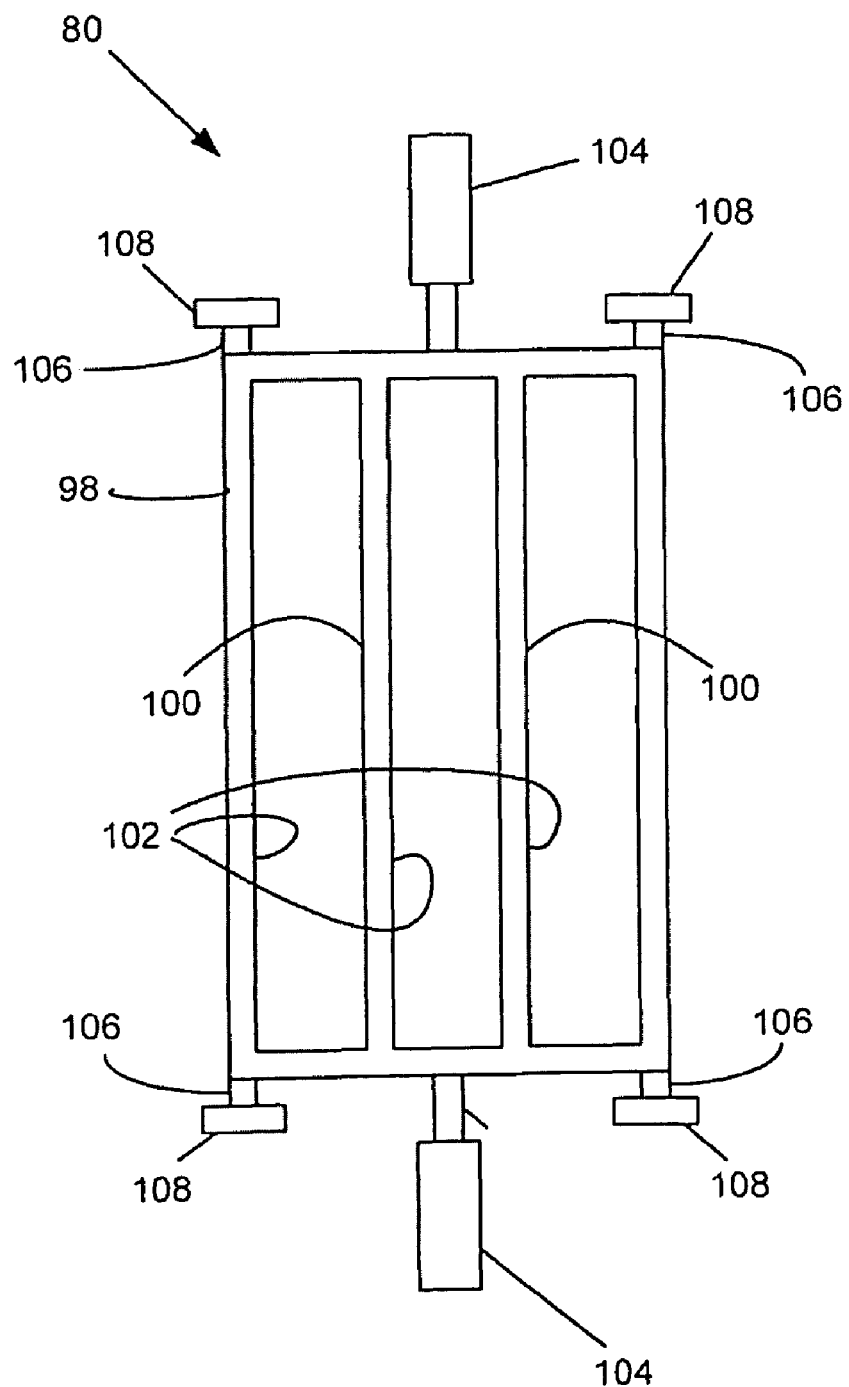
FIG. 10 is a plan view of a movable frame for use with the vacuum boxes of FIGS. 7 and 7A.

FIG. 10 is a plan view of the movable frame 80 which may be used in conjunction with the vacuum box 62 of FIG. 7 (or vacuum box 63 of FIG. 7A) to assist in moving the catalyst for loading into the tubes 16. The movable frame 80 includes a rectangular outer frame 98 with additional horizontal cross members 100 to form openings 102 through which the catalyst can flow. The frame 80 includes removable handles 104 which project through the sides of the vacuum box 62 or 63, as well as projections 106 which terminate in guides 108 for slidingly guiding and supporting the movable frame 80 as it is moved from side to side within the vacuum box 62 or 63.

The movable frame 80 is mounted inside the vacuum box 62 or 63, with the handles 104 and the guides 108 projecting from the sides of the vacuum box 62 or 63. During operation, the catalyst enters the vacuum box 62 or 63 as described earlier, and slides down the inclined screen 86 and through the openings 102 of the movable frame 80. The operator(s) may assist in the transfer of the catalyst through the openings 102 of the movable frame 80 by inserting their hands into the flexible dust barriers 67 built into the portholes 68 of the vacuum box 62 or 63. The movable frame 80 is then moved laterally (horizontally) within the vacuum box 62 or 63 by the operator(s) by grabbing and moving the handles 104. The movable frame 80 sweeps the catalyst across the frame 82 of the vacuum box 62 or 63, or the movable frame 80 may sweep the catalyst directly across the upper tube sheet 12 of the reactor or across sleeves or other templates supported on the upper tubesheet 12 until the catalyst falls into the reactor tubes 16, filling them to the desired height.

The movable frame 80 is a mechanical aid to assist the operator(s) in moving the catalyst within the vacuum box 62 or 63 and into the tubes 16, instead of (or in addition to) inserting the hands through the gloves 67 in the portholes 66 and directly manually manipulating the catalyst to accomplish this task. The movable frame 80 may be automated, being motorized with linear actuators, or pneumatic cylinders, or even with mechanical vibrators instead of being manually moved by the operator(s).

It can be seen in FIG. 7 that the catalyst particles are enclosed within the vacuum box or chamber 62 from the time they are released from the pouches 30 until they enter the reactor tubes 16, thereby minimizing the release of dust.
Operation of the Catalyst Transport Arrangement The catalyst transport arrangement 23 is installed on the job site, preferably by securing sections of the housing 36 to the structure 22 surrounding the reactors 10, 10A, 10B, 10C, 10D, 10E, with the housing 36 extending over all the top openings 18 of the reactors. A catalyst container 25 is placed at a low elevation, typically at ground level, adjacent a first end of the fixed path, and the pouchless lead portion 54 (See FIG. 5) of the elongated belt 24 is fed into the initial sprocket assemblies 26. The sprocket assemblies 26 are driven so as to feed the elongated belt 24 through the sprocket assemblies 26 and into the first reactor 10 and into the vacuum box 62 (See FIG. 7) placed atop the tubesheet 12 inside of the reactor 10.

The desired catalyst loading aid devices may be installed onto the frame 82 inside the vacuum box 62, or sleeves or other templates may be inserted onto the tubesheet 12 beneath the vacuum box 62. The movable frame 80 may also be installed in the slotted opening 78 as described earlier. Vacuum is established in the vacuum lines 70, 72, and the installation is ready for loading catalyst into the reactor tubes 16.

Once the vacuum box 62 is installed over a group of tubes 16 to be loaded with catalyst, an operator standing on the upper tube sheet 12 presses a control button which causes a signal to be sent to a controller that communicates with the drive motor that drives the sprocket assemblies 26, causing the drive motor to drive the sprocket assemblies 26 to advance the belt 24. The signal may be sent through a wire or by a known wireless transmission means. It is preferable that pressing the control button once causes the drive motor to advance the belt the distance from the beginning of one pouch 30 to the beginning of the next pouch in order to advance the belt 24 by one pouch. The controller also signals the actuator on which the knife 90 is mounted, causing the knife 90 to slit open the pouch 30 that has advanced to a position opposite the knife 90. (The knife 90 is mounted on an automated actuator, such as a linear actuator, that causes it to move toward and away from the pouch 30.) Pressing the control button more than once causes the drive motor to advance the belt 24 a distance proportional to a similar number of pouches 30.

The catalyst 32 (See FIG. 3) in the pouch 30 then spills out of the pouch 30 and onto the screen 86. The whole catalyst particles slide a relatively short distance down the inclined screen 86, while catalyst dust and small catalyst fragments pass through the screen 86, are pulled into the vacuum line 70, and are carried by the vacuum line to a cyclone separator or other dust collection device (not shown) where the dust and fragments are recovered. The whole catalyst particles are then manipulated by the operators who insert their hands through the portholes 66 and into the built in flexible, dust barriers or who move the movable frame 80 back and forth using the handles 104 shown in FIG. 10, which project outside of the box 62. The catalyst particles then fall out the open bottom of the box 62 and into the tubes 16 which are under the vacuum box 62. The movable frame 80 may also be moved by automated means, as described earlier, such as by a reversible motor, linear actuator, pneumatic air cylinder, or mechanical vibrator.

If more catalyst is needed, an operator presses the control button once again and another pouch 30 of catalyst is advanced and unloaded into the vacuum box 62. The empty pouches remain on the belt 24, which is then pulled back up through the top opening 18 of the reactor 10, and the entire elongated belt 24 continues on its way to the remaining reactors downstream of the first reactor. This same procedure may be repeated for each reactor along the fixed path. Sensors may be placed at various locations along the fixed path to ensure that the pouches are automatically advanced until a pouch 30 which has not yet been emptied is finally slit open by the knife 90. This feature is particularly useful when loading any downstream reactors, as the upstream reactor(s) may have left a large number of empty pouches 30 on the elongated belt 24. A sensor and control scheme is described below with respect to a second embodiment of the catalyst transport arrangement 23.

Figure 7A:
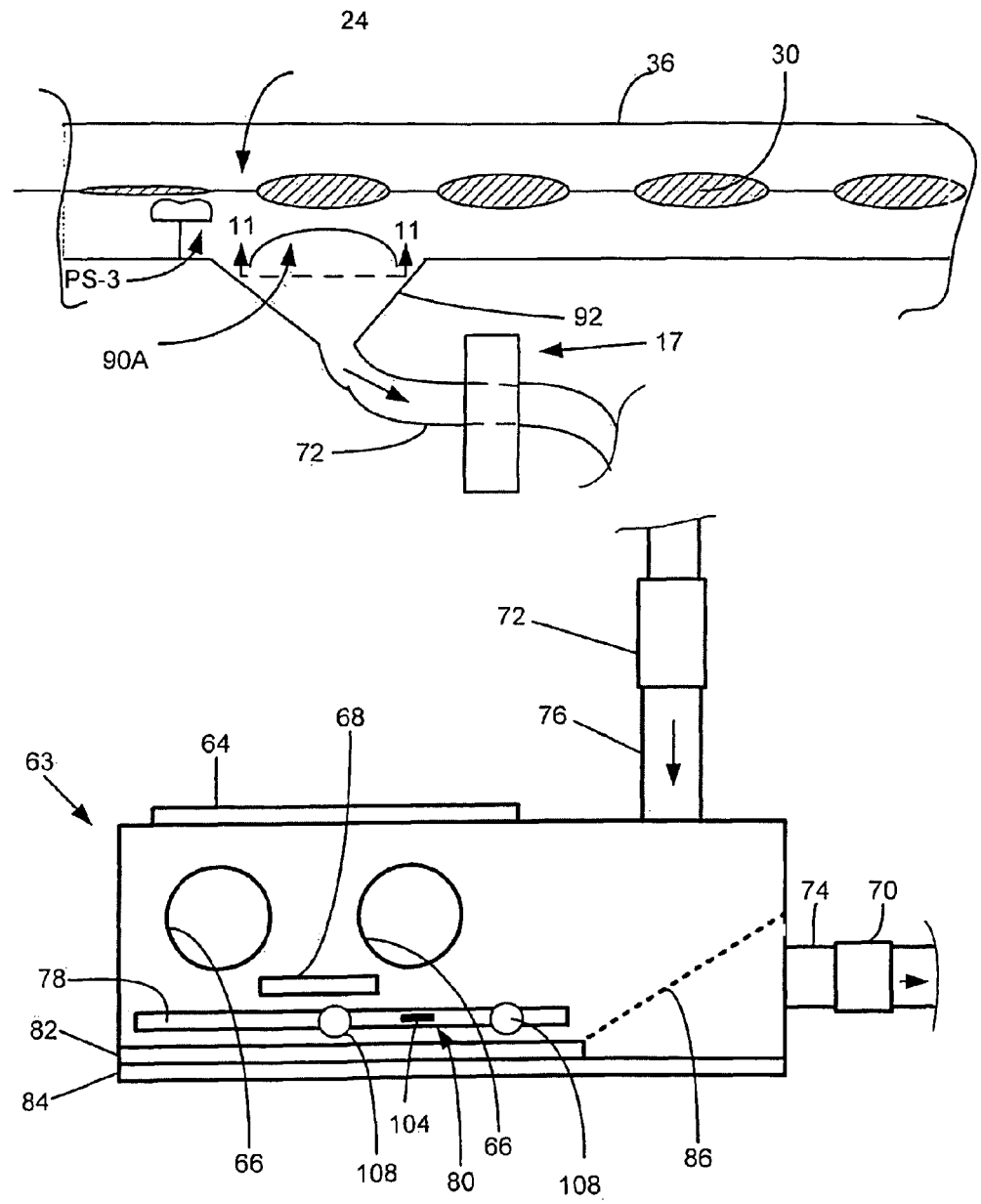
FIG. 7A is a section view, similar to that of FIG. 7, but for an alternative embodiment of a vacuum box.
Figure 7B:
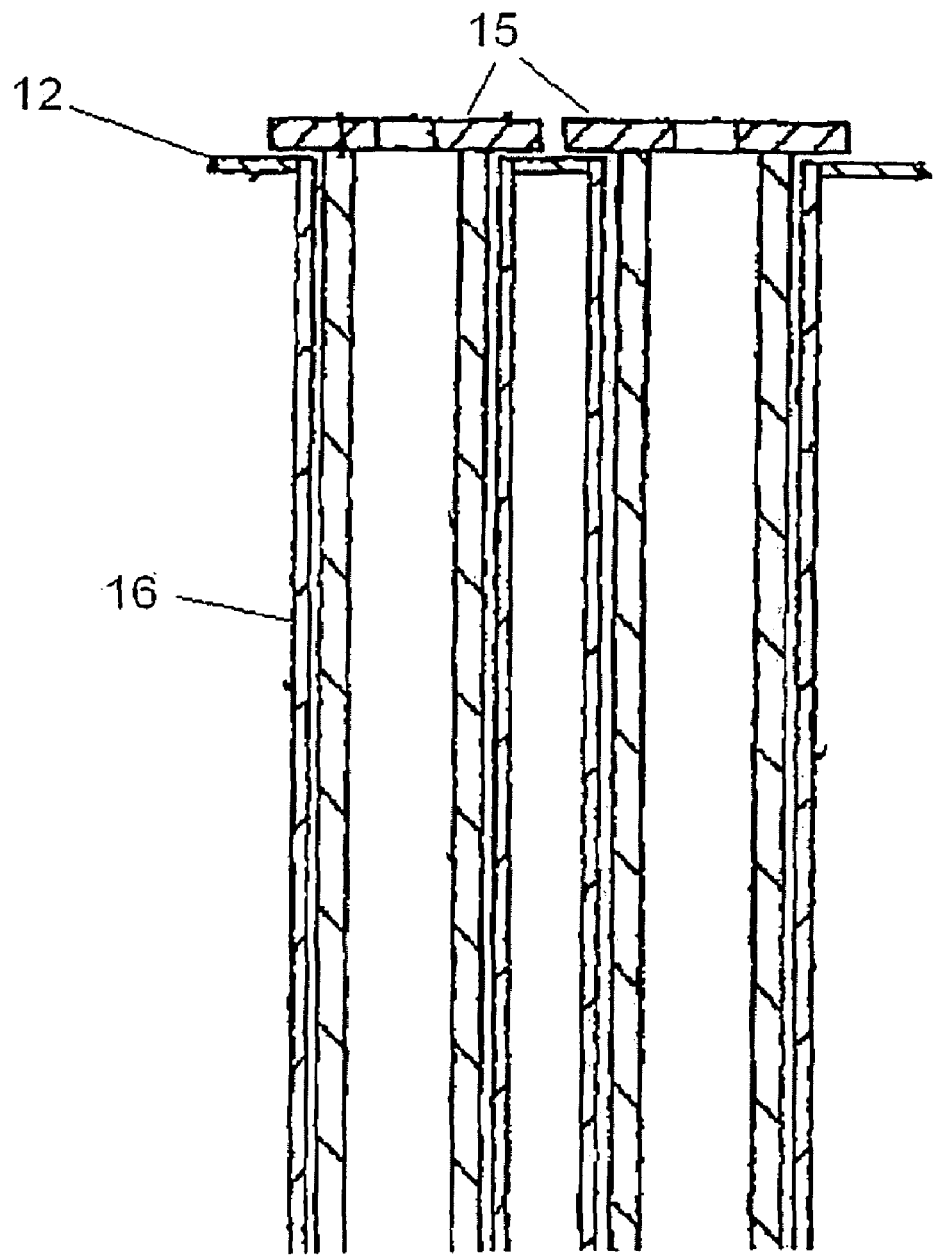
FIG. 7B is a section view showing loading sleeves inserted into the reactor tubes.

FIG. 7A depicts an alternative embodiment of a vacuum box 63 for use in the system 23. This vacuum box 63 is very similar to the vacuum box 62 described above, except it does not have the sprocket assembly 26, the knife 90, or the slotted opening 88 for admittance of the elongated belt 24 into the box 62. Instead, the line 72 is a flexible hose and serves as the catalyst inlet line, through which the catalyst pellets are admitted into the reactor 10 after they have been released from the pouches 30 of the elongated belt 24 near a manway but while still outside the reactor 10, as described in more detail below.

Figure 9:
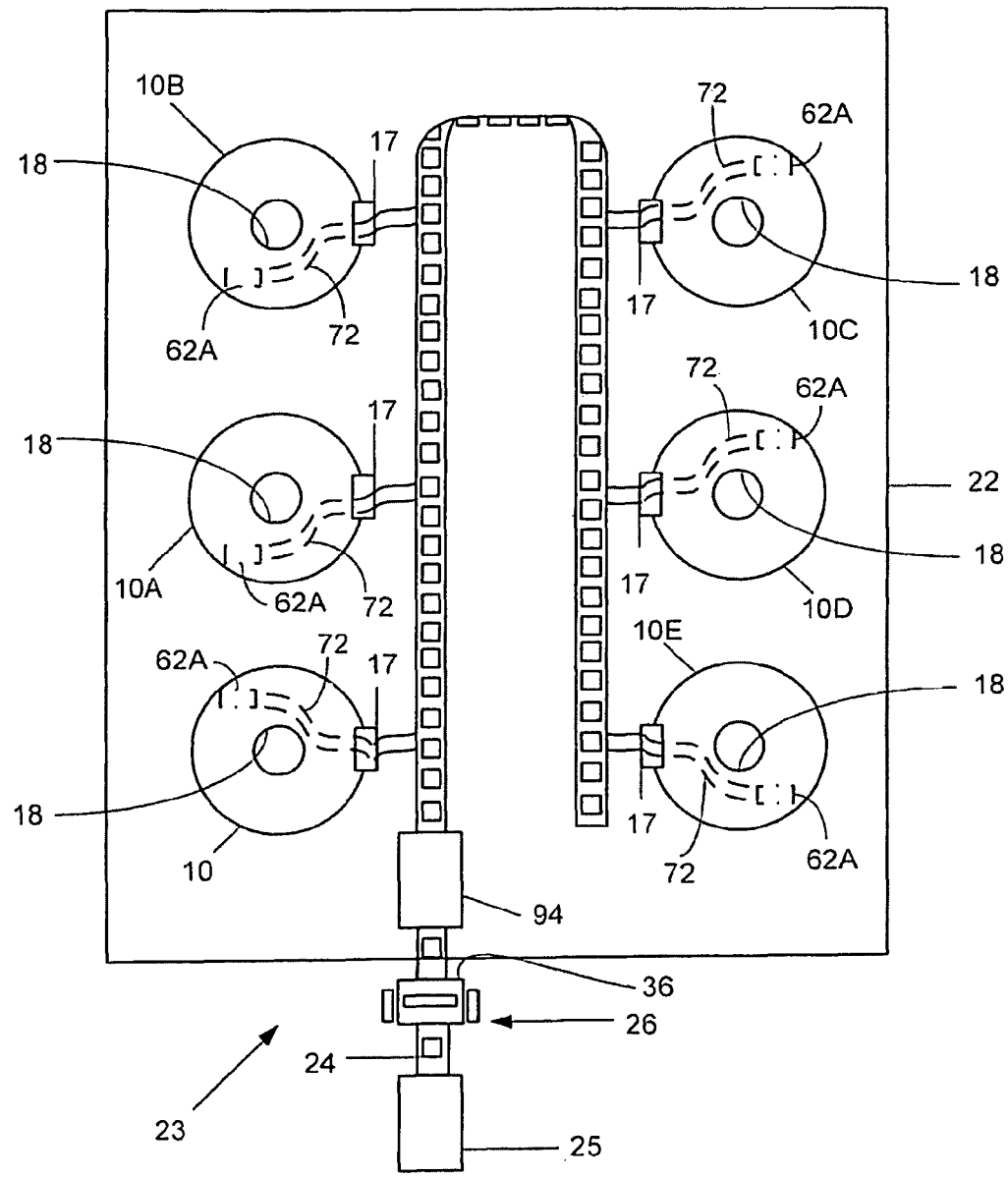
FIG. 9 is a plan view, similar to that of FIG. 8, but for catalyst entering the reactors via the manways instead of via the top opening, and including an intermediate catalyst staging container as shown in FIG. 6.

FIG. 9 is a plan view, similar to that of FIG. 8, showing a catalyst transport arrangement installation wherein the catalyst is loaded into the reactors 10, 10A, 10B, 10C, 10D, 10E through the side manways 17 instead of through the top manways 18 (although the vacuum box 63 could load through a top manway 18 as well.

Referring briefly to FIG. 7A, the vacuum box 63 is very similar to the vacuum box 62 described above, except that, instead of bringing the elongated belt 24 into the vacuum box 62 where the pouches 30 are slit open, only the catalyst itself is brought into the vacuum box 63 via the flexible line 72. In this case, the enclosure 36 becomes part of the vacuum chamber, so the catalyst particles are enclosed in the vacuum chamber from the time they are released from the pouches 30 until they fall into the reactor tubes 16. The upper portion of FIG. 7A schematically depicts the elongated belt 24 as it travels just outside the reactor. (See also FIG. 9) The elongated belt 24 is enclosed within the housing 36, which, at a location just outside a manway 17, and at an elevation above the manway 17, forms a funnel 92 to receive catalyst which falls out of a pouch 30 as it is slit open by the knife 90A. The funnel 92 guides the catalyst into the line 72, which extends through the manway 17 and into the vacuum box 63 at a location just above the screen 86. The vacuum box 63 otherwise operates in the same manner as the vacuum box 62 described earlier, with dust leaving through the outlet 74, and with the operator(s) manipulating the catalyst by hand or with the movable frame to cause it to fall into the reactor tubes 16.

In this embodiment, the elongated belt 24 does not physically enter into the reactor. Instead, it travels just outside the reactor where the knife 90A slits the pouches 30 to release the catalyst, which is then transported through the line 72 into the reactor. Of course, this arrangement could be used to transfer the catalyst into the reactor via the upper opening 18 instead of the side opening 17. In that case, the line 72 would be routed through the upper opening 18 instead.

It may be determined during normal operation that it is desirable to throttle back, or even totally close, the air vents 68 of the vacuum box 63 in order to improve the vacuum effect caused by the vacuum line 70, and this can be done manually, if desired.

As explained above, the drive motor for the catalyst transport arrangement 23 may be controlled by the operator to automatically provide catalyst on demand to a particular reactor by simply depressing a control button. A more complex control system may be used, which provides catalyst on demand as described above, but also provides additional features.

For example, the system may include staging and tracking the progress of the elongated belt 24 to prevent empty pouches 30 from becoming interspersed with full pouches 30, regardless of the loading order of the reactors 10, 10A, 10B, 10C, 10D, 10E. This feature allows all the remaining catalyst to be stored back in the original catalyst container 25 by simply reversing the drive of the sprocket assemblies 26 until the last full pouch 30 is back in the container 25. The belt 24 may be cut at that point and the rest of the belt 24, which now contains only empty pouches 30, may be thrown out.

Referring to FIG. 1, a pressure sensor switch PS-1 (or some other means of detection such as a load cell, a photo cell, or a mechanical roller that detects the 'bulge' of a full pouch 30, or the absence of that bulge) is placed under the elongated belt 24 just after the first sprocket assembly 26. As soon as the elongated belt 24 in the container 25 has been fully pulled out of the container 25 and the pouchless trailing portion 56 reaches the location of the pressure sensor switch PS-1, the switch (or other detector) senses that the end of the elongated belt has been reached and sends a signal or an alarm to the operator indicating that it is time to install a new container 25 with its elongated belt 24.

Figure 6:
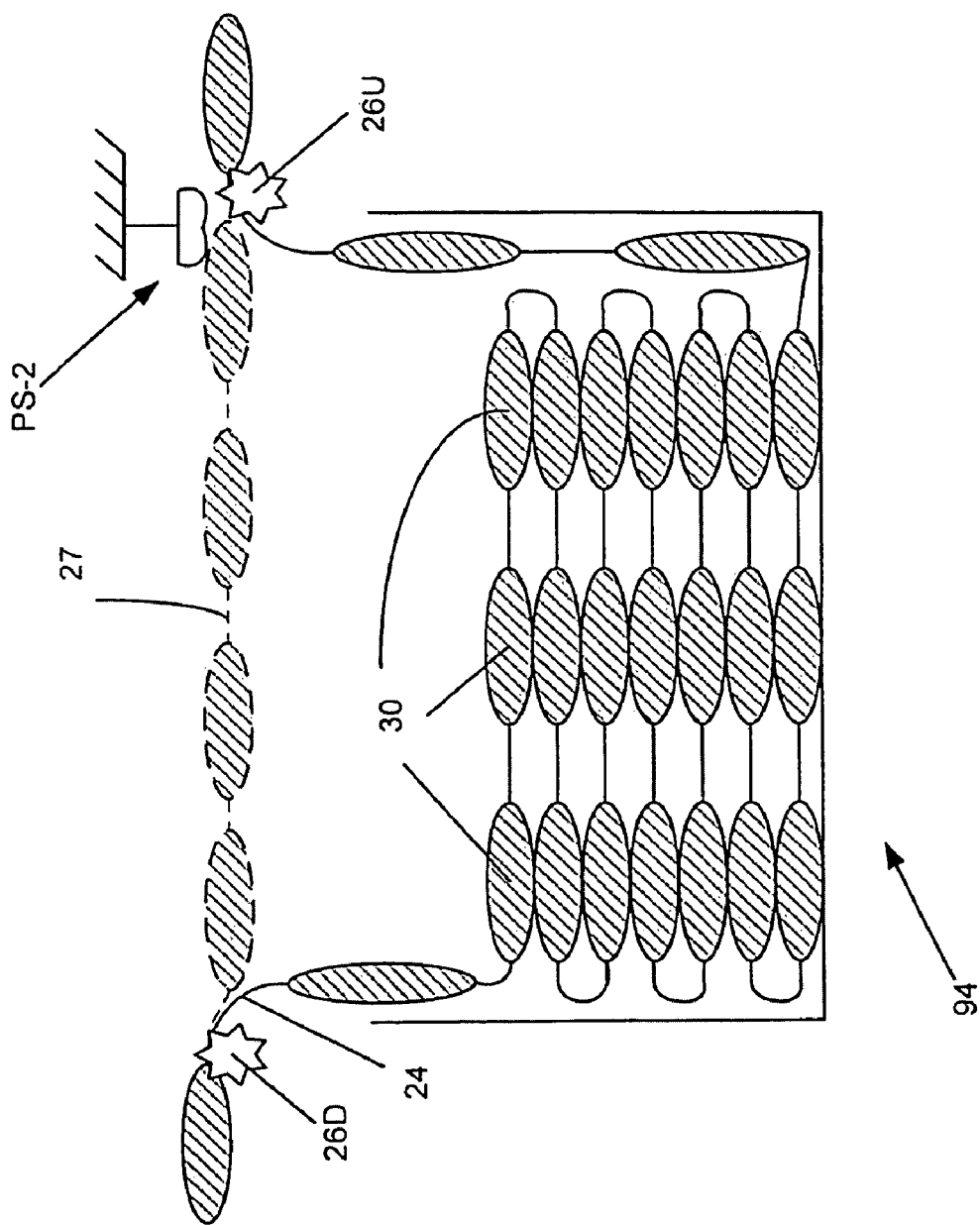
FIG. 6 is a schematic section view, similar to that of FIG. 5, but for a catalyst staging container.

Referring to FIGS. 6 and 9, this embodiment of the catalyst transport arrangement 23 includes a catalyst staging container 94 located just before the first reactor 10. In this arrangement, the downstream sprocket 26D and all sprockets between that downstream sprocket 26D and the next downstream staging container 94 are driven by a separate drive from the upstream sprocket 26U and the sprockets upstream of the upstream sprocket 26U. For simplicity, the following discussion assumes the presence of only two reactors, 10 and 10A and one catalyst staging container 94 just upstream of the first reactor 10. It will be obvious how to extrapolate this same control to any number "N" of reactors by providing "N−1" catalyst staging containers 94, one before each reactor except the last reactor, and N separate drives.

FIG. 6 shows the catalyst staging container 94 in some detail. Under "normal" conditions, when the catalyst transport arrangement 23 is taking catalyst to the first reactor 10, the elongated belt 24 goes directly across the top of the catalyst staging container 94, as shown in phantom, and the pressure sensor switch PS-2 is activated by the presence of the elongated belt 24 pushing up against the pressure sensor switch PS-2. The upstream drive and the downstream drive are both operating in a synchronized manner, to drive the elongated belt whenever the operator pushes the button demanding more catalyst.

If the catalyst changeover personnel decide to load catalyst in the second reactor 10A first, before reactor 10 has been loaded, the elongated belt 24 will advance with loaded pouches 30 until the first loaded pouch 30 reaches the second reactor 10A, at which time the knife 90A slits open the pouch 30 that is at that reactor, and the catalyst spills into the funnel 92 and down into the vacuum box 63 inside reactor 10A.

Assume, as an example, that there are fifteen (15) fully loaded pouches 30 between the pouch 30 that has just been slit open at the manway of the second reactor 10A and the pouch 30 that is at the manway 17 of first reactor 10. When all the tubes 16 in the second reactor 10A are fully loaded with catalyst, these fifteen fully loaded pouches 30 of catalyst will already be downstream of the first reactor 10. If an operator in the first reactor 10 now decides to start loading catalyst into the first reactor 10, as he presses his control button demanding catalyst, the pressure sensor switch PS-3 (see FIG. 7A) just downstream of the funnel 92 corresponding to the first reactor 10 senses pressure from a loaded pouch 30 at that location and gives instructions for the downstream sprocket drive 26D at the staging container 94 upstream of the first reactor 10 (See FIGS. 6 and 9) to reverse itself, sending that pouch 30 back (while the upstream drive which drives the sprocket 26U is not driving), and it will continue to drive the downstream drive in reverse until the pressure sensor switch PS-3 at the first reactor 10 detects that there is no longer a loaded pouch 30 at that location. In this example, the drive will therefore reverse itself until it sends fifteen pouches 30 back to the staging container 94 upstream of the first reactor 10, and fifteen pouches will therefore end up in the catalyst staging container 94 of FIG. 6.

The pressure sensor switch PS-2 above the catalyst staging container 94 will sense a lack of tension in the elongated belt 24 as it is falling into the catalyst staging container 94, as shown in FIG. 6.

When the operator pushes the button demanding additional catalyst, the downstream drive will drive the sprocket 26D, but the pressure switch PS-2 at the staging container 94 will not allow the upstream drive to operate until the elongated belt 24 inside the staging container 94 has been fully extended, at which point the pressure switch PS-2 senses the tension in the elongated belt 24, which then causes it to signal the upstream drive to drive the upstream sprocket 26U (and the other sprockets upstream of the staging container 94).

As indicated above, this same control scheme can be applied to an installation with any number "N" of reactors by using "N–1" catalyst staging containers 94 and "N" separate drives. Of course, other control schemes may alternatively be used.

For instance, a sequencer can keep track of every pouch 30 which goes past the funnel portion 92 of each reactor, and then subtract from this the number of pouches slit open by knives 90A downstream of the funnel portion 92 of each reactor. (The number of pouches slit open can be determined by the number of times the knife is advanced.) Then, when a particular reactor calls for catalyst, its corresponding sequencer would instruct the drive to reverse itself until that total number of "unused" pouches has been placed back upstream of that particular reactor. In essence, each reactor would always be first in line with unused pouches 30 when catalyst is called for in that reactor. The installation could do away with all the catalyst staging containers 94, and the elongated belt 24 would simply feed from or reverse back into the catalyst container 25.

The control scheme may also include sophisticated programming and instrumentation to allow the operators more flexibility during the catalyst loading operation. For instance, the operator in the reactor may not only request additional catalyst; he may request additional catalyst at an approximate demand rate, such as two pouches 30 per minute, along with a display of the set rate. This could also include a graphic display of the requested demand rate as well as of the actual rate in terms of pouches per hour, pounds per hour, amount of catalyst delivered so far as a percent of total catalyst estimated for the reactor loading operation, and other data which the operators and/or the plant may find useful to track during the catalyst change operation.

The control button for controlling the catalyst transport arrangement 23 may be in the reactor, preferably within easy reach of the operator(s) loading the tubes 16 of the reactor. For instance, if a vacuum box 62 or 63 is being used, the control button (or other control input device) may be mounted on the vacuum box 62 or 63. The control button may be wired to the catalyst transport arrangement 23, or the control button may send a wireless signal by means of a transmitter to a receiver that communicates with a controller which controls the drive motors and actuators.

Preferably, the control button is depressed once by the operator to advance the belt 24 the correct distance to have: one pouch 30 or 30' (See FIG. 13) of catalyst discharged into the reactor or, if the control allows it, the operator dials in the number of pouches or the desired demand rate, for instance, and the belt 24 automatically delivers the catalyst as requested without the need for the operator to continue pressing the control button until the catalyst is delivered. In a simple control arrangement, pressing the control button signals the controller for the catalyst transport arrangement 23 to deliver a pouch of catalyst. The controller then causes the drive to operate a sufficient period of time to deliver that pouch of catalyst. More complex control arrangements would allow the operator to send a signal to request a specific number of pouches or for a certain rate of delivery and for the controller to control the drive motor (or motors) accordingly.

When there are multiple reactors, one possible arrangement would be to provide a dedicated catalyst transport arrangement 23 for every reactor in the plant, or for groups of reactors in a plant, such as a catalyst transport arrangement 23 for reactors 10, 10A, and 10B, and another catalyst transport arrangement 23 for reactors 10C, 10D, and 10E in FIG. 9.

Figure 11A:
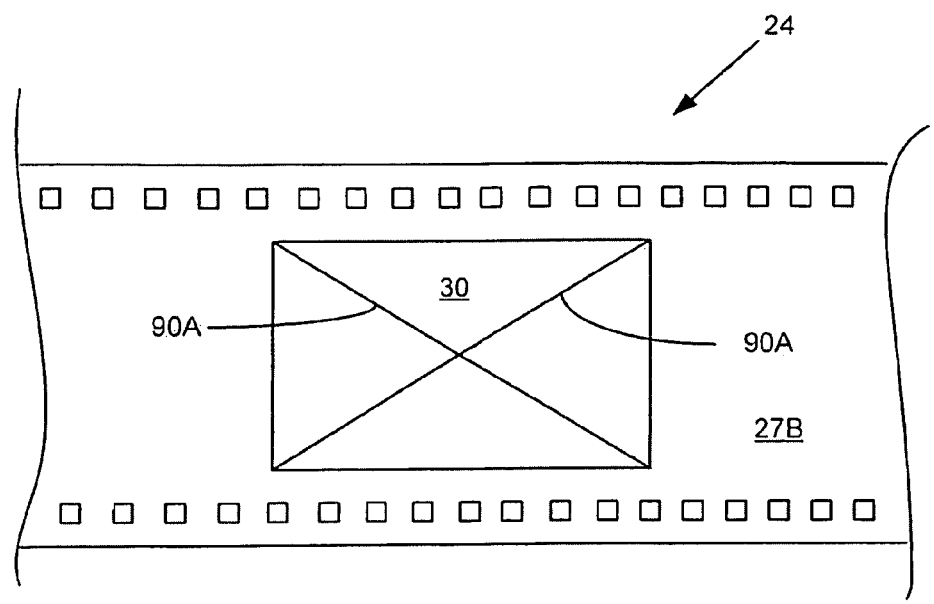
FIG. 11A is a view along line 11-11 of FIG. 7A, showing the knife.
Figure 11B:
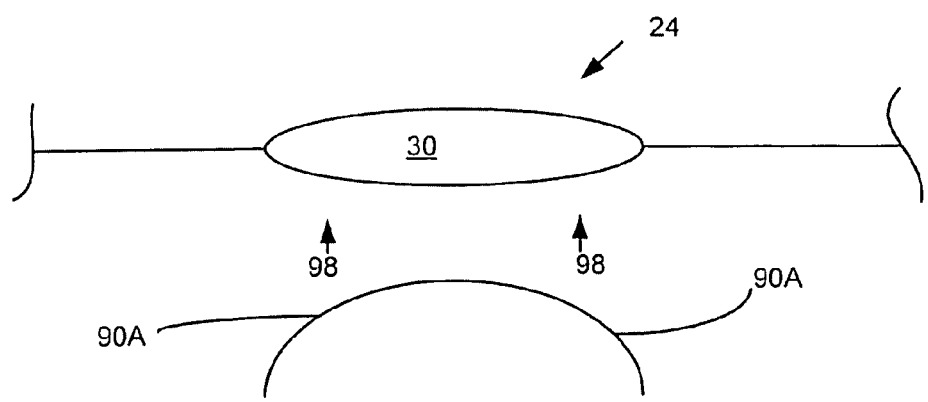
FIG. 11B is a side view of the pouch and knife of FIG. 11A.

FIG. 11A is a section view along line 11-11 of FIG. 7A, depicting an embodiment of the knife 90A for slitting open the pouches 30 of the elongated belt 24. In this embodiment, the knife 90A is an "X" shaped flexible wire which may be heated up by some means, such as electrical resistance, in order to melt through the pouch 30. In this instance, the pouch 30 is rectangular shaped, and as the knife 90A is moved in the direction of the arrows 98 as shown in FIG. 11B and brought up against the pouch 30, the axes of the wire 90A align with the corners of the pouch 30.

Figure 12A:
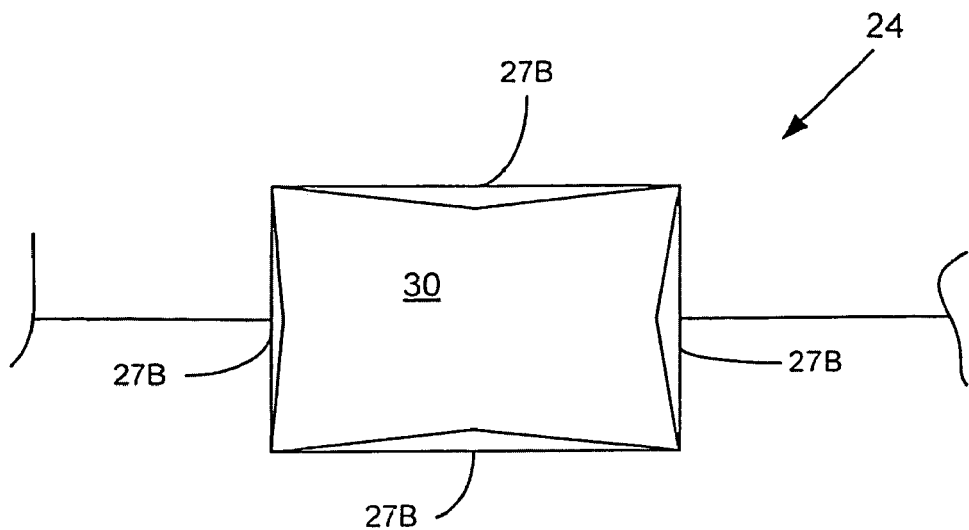
FIG. 12A is a view similar to that of FIG. 11A but after the knife has slit open the pouch, emptying out the catalyst (with the knife omitted for clarity)
Figure 12B:
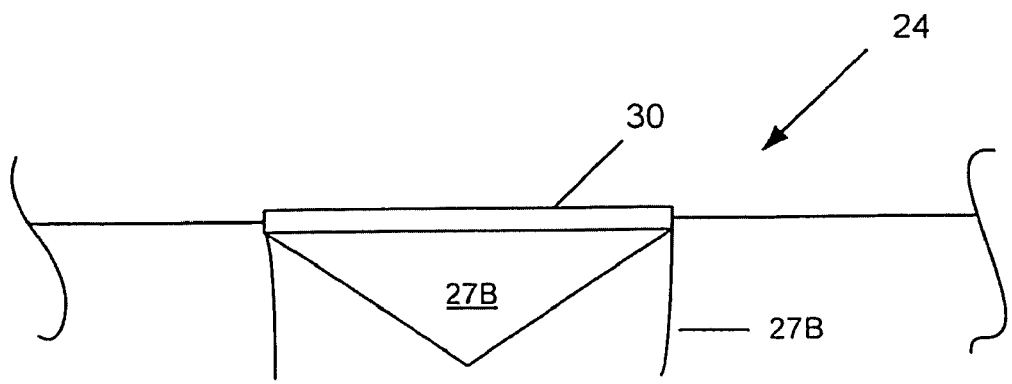
FIG. 12B is a side view of the pouch of FIG. 12A.

The hot wires 90A melt through the plastic film 27B of the pouch 30, and the weight of the catalyst 32 in the pouch 30 (See also FIG. 3) opens up the plastic film 27B in the area of the pouch 30, as shown in FIGS. 12A and 12B, releasing the catalyst 32 into the funnel 92. The wires 90A are flexible enough to bend and adapt to the shape of the bottom film 27B in the area of the pouch 30 to ensure that this bottom film 27B is split open into the four flaps shown, so as to release all the catalyst in the pouch 30.

Figure 13:
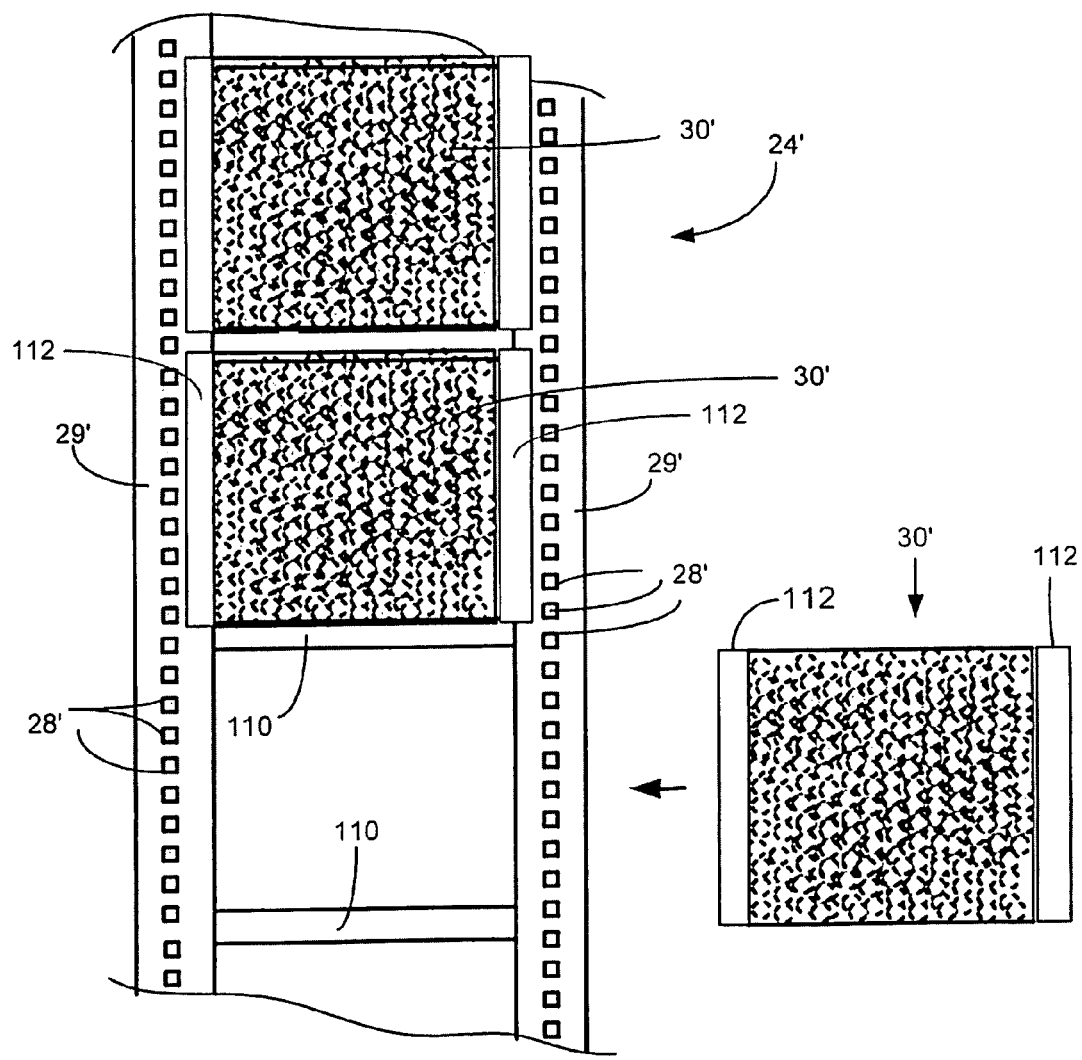
FIG. 13 is a plan view of vacuum-packed catalyst, similar to that of FIG. 1, but for another embodiment.

FIG. 13 is a plan view of an alternative elongated belt 24' which may be used in the catalyst transport arrangement 23 of FIG. 1. The elongated belt 24' includes two parallel strips 29' defining evenly-spaced, longitudinally aligned guide holes 28', interconnected by spaced-apart straps 110. This elongated belt 24' is designed to travel along the fixed path with the sprocket assemblies 26 engaging and driving the elongated belt 24'.

Individual pouches 30' of catalyst (preferably vacuum packed and/or shrink-wrapped, see more detail below) include flat side flaps 112 which contain no catalyst and which may be used to secure the pouches 30' to the belt 24' so that the pouches 30 are located in an area intermediate the two strips 29' as well as intermediate two adjacent interconnecting straps 110, as shown in FIG. 13. The pouches 30' may be secured to the belt 24' by any suitable means, including, for instance, by fusing the flaps 112 to the side strips: 29', or by riveting or clamping the flaps 112 to the side strips 29'.

Other than the fact that the pouches 30' are independent from and secured to the belt 24', the elongated belt 24' operates in substantially the same manner as the elongated belt 24 described earlier, with both the pouches 30 and the pouches 30' being mounted on their respective belts.

Figure 16:
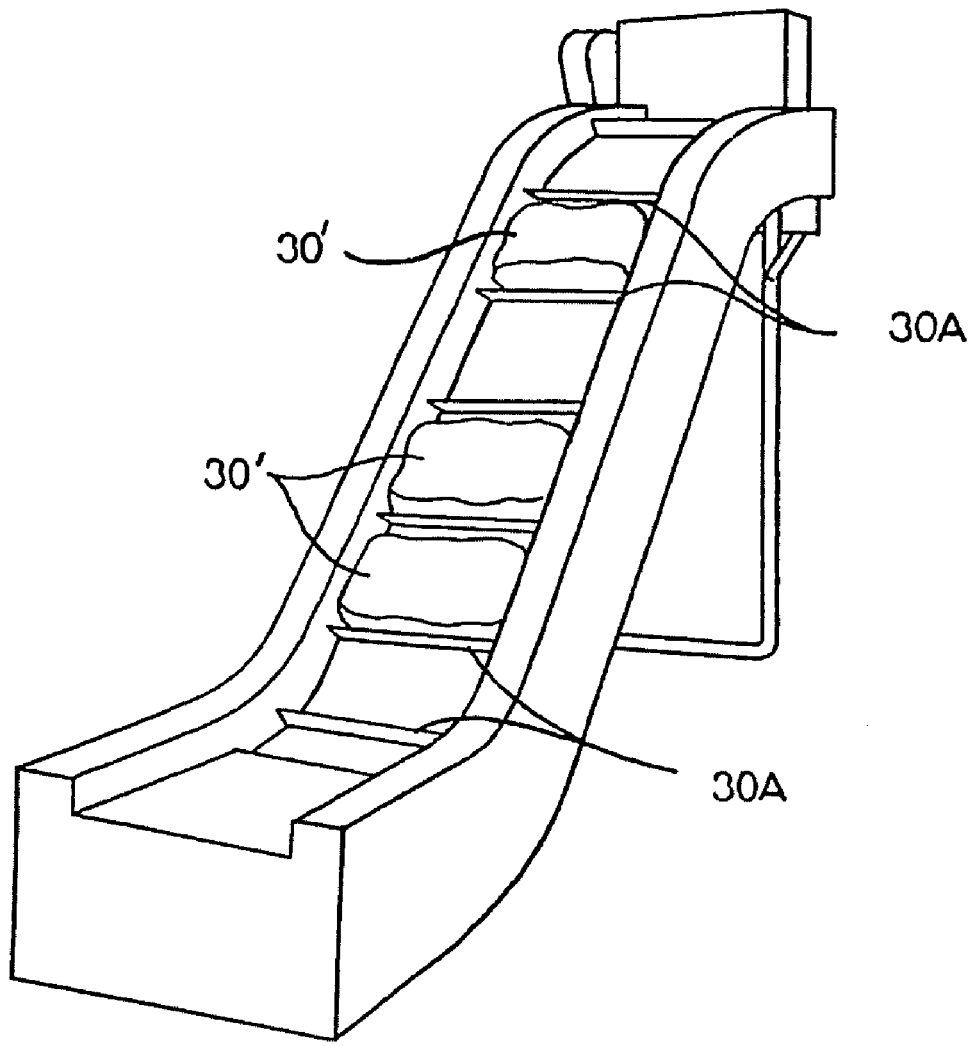
FIG. 16 is a schematic perspective view of an inclined belt conveyor.

The individually packed pouches 30' may alternatively be transported on conventional conveyor systems, such as belt conveyors or chain conveyors. In that case, the pouches may be mounted on the conveyor chain, which functions as a belt. FIG. 16 shows a standard belt conveyor having flights 30A, which prevent the pouches 30' from sliding downhill, so in that case the pouches are arranged at spaced-apart intervals along the belt without being positively secured to the belt as in the previous embodiments. The belt could have pockets to receive the pouches 30'; or the pouches 30' may be hooked or clamped or otherwise secured along the elongated belt 24 so that they travel with the chain or belt. It is desirable for the conveyor to have a similar control system that permits the operator to control the drive motor so the pouches 30' are delivered as needed.

Once at the desired elevation, the pouches 30' may be transported on conventional conveyor systems, or even via a gravity-assisted chute, to deliver the pouches 30' to the station where they may be slit open and emptied of their contents. This station could be very similar to the funnel-shaped station 92 of FIG. 7A, where a knife 90A, or even an operator with a hand-held knife, could slit open the pouches 30' for delivery of the catalyst to the reactor tubes 16.

As indicated earlier, the pouches 30 or 30' are preferably vacuum packed or shrink-wrapped in order to compress the catalyst particles inside the pouch so the pressure inside the pouches 30 is substantially less than the atmospheric pressure outside the pouches, and so that the catalyst particles are not free-flowing and do not move appreciably relative to each other within the pouches as the pouches are moved. The pressure differential between the outside pressure and the inside pressure preferably is five pounds per square inch or greater, and more preferably ten pounds per square inch or greater, so, for example, the ambient pressure may be 14 pounds per square inch, and the internal pressure may be four pounds per square inch or less. Shrink wrapping is a simple and easy heat application to shrink film draped over and attached to an object, such as the catalyst pellets. Heat from a heat gun or from a heated tunnel causes the shrink film to shrink in size and compress against the product inside in order to conform to its shape.

Vacuum packaging is the process of removing air around a product and then sealing that product in an air tight package. Vacuum packaging systems typically fall into two categories, as described below.

Figure 14:
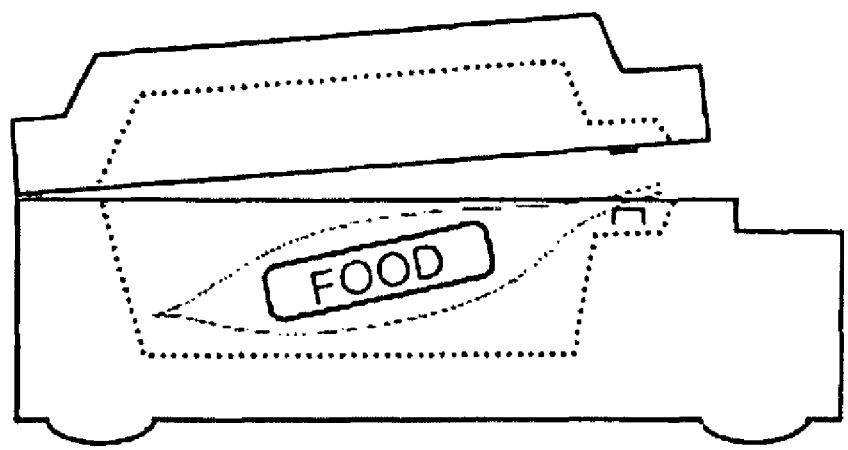
FIG. 14 is a schematic of a commercial vacuum packaging machine.

Most commercial vacuum packaging systems are vacuum chambers (See FIG. 14). The product to be packaged is placed inside a bag that is entirely in a chamber, the lid is closed, and a high speed commercial vacuum pump extracts the air from the entire chamber. When the air has been extracted, a commercial-grade heat strip seals the bag, then air is allowed back into the chamber surrounding the vacuum sealed bag, and the vacuum sealed product is removed. Commercial machines of this type typically use multi-ply bags that are smooth on both the inside and the outside and use thermoplastic film to form the bag so it can easily be sealed by applying heat to fuse two layers of film together.

Figure 15:
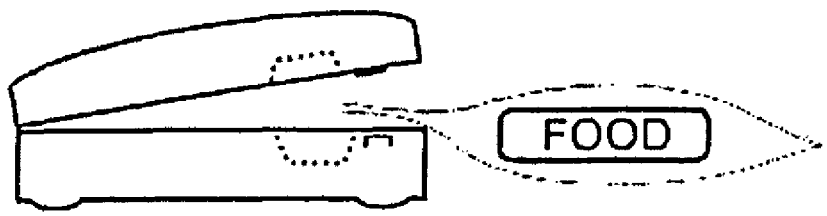
FIG. 15 is a schematic of a non-commercial vacuum packaging machine.

Referring to FIG. 15, non-commercial duty vacuum packaging machines often are of the external-vacuum type, meaning that nearly all of the bag (as well as the product) remains surrounded by normal atmospheric pressure as air is extracted from it. Only the open end of the bag extends within the vacuum machine. Vacuum sealing bags made for use with external-vacuum machines may be multi-ply like their commercial counterparts, but the inside surface of non-commercial duty bags is made with tiny ridges that allow air to be extracted from between two pieces of the plastic even though they're pressed tightly together, as they are when the lid of the vacuum machine closes over them to remove air from the bag. (Another, newer type of bag for external-vacuum machines uses a third strip of "mesh" plastic fused inside one bag side, in place of ridges) While FIGS. 14 and 15 show food being vacuum packaged, it is understood that in this case the product inside the bag is catalyst pellets.

It will be obvious to those skilled in the art that modifications may be made to the embodiments described above without departing from the scope of the present invention.

What is claimed is:

1. A method for transporting catalyst particles to a chemical reactor having at least one vertical tube with a top and a bottom, said vertical tube being supported by a top tube sheet, comprising the steps of:
   providing a plurality of pouches, each containing a plurality of catalyst particles;
   arranging said pouches at intervals along a belt; and
   using drive means to drive said belt along a predetermined fixed path to transport the pouches from a low elevation to an elevation above the top of the vertical tube.

2. The method for transporting catalyst particles to a chemical reactor recited in claim 1, wherein said fixed path is defined by a plurality of fixed belt guides, and further including the step of guiding said belt by means of said fixed belt guides as the belt is being driven along said fixed path.

3. The method for transporting catalyst particles to a chemical reactor recited in claim 2, and further comprising the step of securely mounting the pouches on the belt.

4. The method for transporting catalyst particles to a chemical reactor recited in claim 2, wherein said pouches are sealed and have an internal pressure that is at least five pounds per square inch below ambient atmospheric pressure.

5. The method for transporting catalyst particles to a chemical reactor recited in claim 4, wherein said belt defines a plurality of evenly-spaced openings and said fixed belt guides include sprockets that engage said belt at said openings.

6. The method for transporting catalyst particles to a chemical reactor recited in claim 4, wherein said belt is part of a standard belt conveyor.

7. The method for transporting catalyst particles to a chemical reactor recited in claim 4, and further comprising the step of enclosing at least a portion of said fixed path to protect the pouches from inclement weather as the pouches are being transported.

8. The method for transporting catalyst particles to a chemical reactor recited in claim 4, and further comprising the steps of opening the pouches to release the catalyst particles and allowing the catalyst particles to flow by gravity into the vertical tube.

9. The method for transporting catalyst particles to a chemical reactor recited in claim 8, and further comprising the steps of enclosing the catalyst particles within a vacuum chamber from the point at which the catalyst particles are released from their pouch until they flow into their respective tube and providing a vacuum line that vacuums air from said vacuum chamber to a remote location.

10. The method for transporting catalyst particles to a chemical reactor recited in claim 9, and further comprising the step of pushing the catalyst particles within the vacuum chamber in order to distribute the particles over the tube sheet.

11. The method for transporting catalyst particles to a chemical reactor recited in claim 10, and further comprising the step of controlling the drive means from a position adjacent the upper tube sheet.

12. The method for transporting catalyst particles to a chemical reactor recited in claim 3, and further comprising the steps of opening the pouches to release the catalyst particles and allowing the catalyst particles to flow by gravity into the vertical tube.

13. The method for transporting catalyst particles to a chemical reactor recited in claim 12, and further comprising the steps of enclosing the catalyst particles within a vacuum chamber from the point at which the catalyst particles are released from their pouch until they flow into their respective tube and providing a vacuum line that vacuums air from said vacuum chamber to a remote location.

14. The method for transporting catalyst particles to a chemical reactor recited in claim 13, and further comprising the step of pushing the catalyst particles within the vacuum chamber in order to distribute the particles over the tube sheet.

15. The method for transporting catalyst particles to a chemical reactor recited in claim 14, and further comprising the steps of depositing the catalyst particles onto a screen within the vacuum chamber and vacuuming out dust and fines that fall through the screen.

16. The method for transporting catalyst particles to a chemical reactor recited in claim 15, wherein the step of spreading the catalyst particles includes inserting a hand into a flexible enclosure sealed to the vacuum chamber, and using the hand to spread the catalyst particles inside the vacuum chamber.

17. The method for transporting catalyst particles to a chemical reactor recited in claim 15, wherein the step of spreading the catalyst particles includes shifting a movable frame back and forth across the vacuum chamber.

\* \* \* \* \*